(12) United States Patent
Fujii

(10) Patent No.: US 7,822,237 B2
(45) Date of Patent: Oct. 26, 2010

(54) IMAGE MATCHING APPARATUS, IMAGE MATCHING METHOD, AND IMAGE MATCHING PROGRAM

(75) Inventor: Yusaku Fujii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1090 days.

(21) Appl. No.: 11/068,935

(22) Filed: Mar. 2, 2005

(65) Prior Publication Data

US 2005/0147282 A1 Jul. 7, 2005

Related U.S. Application Data

(63) Continuation of application No. PCT/JP03/04784, filed on Apr. 15, 2003.

(51) Int. Cl.
G06K 9/00 (2006.01)
G06K 9/62 (2006.01)
G06F 21/00 (2006.01)

(52) U.S. Cl. ............ 382/124; 382/209; 340/5.53; 340/5.83; 713/186

(58) Field of Classification Search ........... 382/124, 382/115–117, 125, 118–123, 126, 127, 209–225; 340/5.1, 5.2, 5.52, 5.53, 5.8–5.86; 713/186
See application file for complete search history.

(56) References Cited

U.S. PATENT DOCUMENTS 5,359,513 A 10/1994 Kano et al.

| | | | |
|---|---|---|---|
| 2002/0041700 A1* | 4/2002 | Therbaud | 382/124 |
| 2003/0007671 A1* | 1/2003 | Ailisto et al. | 382/124 |
| 2004/0175023 A1* | 9/2004 | Svedin et al. | 382/124 |
| 2005/0147282 A1* | 7/2005 | Fujii | 382/124 |

FOREIGN PATENT DOCUMENTS

| | | | |
|---|---|---|---|
| JP | 2-245980 | | 10/1990 |
| JP | 6-162174 | | 6/1994 |
| JP | A-H6-162174 | * | 6/1994 |
| JP | 6-195448 | | 7/1994 |
| JP | 6-223160 | | 8/1994 |
| JP | 7-37074 | | 2/1995 |
| JP | 8-110939 | | 4/1996 |
| JP | H9-73540 | | 3/1997 |
| JP | 2001-243465 | | 9/2001 |
| JP | 2002-539683 | | 11/2002 |
| WO | WO 00/54494 | | 9/2000 |

OTHER PUBLICATIONS

Japanese Patent Office Notice of Rejection Grounds, mailed Feb. 5, 2008 and issued in corresponding Japanese Patent Application No. 2004-570881.
Office Action issued in corresponding Japanese Patent Application No. 2004-570881, mailed on Oct. 16, 2007.

* cited by examiner

*Primary Examiner*—Aaron W Carter
(74) *Attorney, Agent, or Firm*—Fujitsu Patent Center

(57) ABSTRACT

When two images are matched, a partial image S is registered in advance, mutual relative position is obtained when the partial image S and an image I indicate the largest overlap. Based on the relative position, the relative position between the image T and the image I is determined. Thus, it is determined whether or not the image T and the image I match.

14 Claims, 31 Drawing Sheets

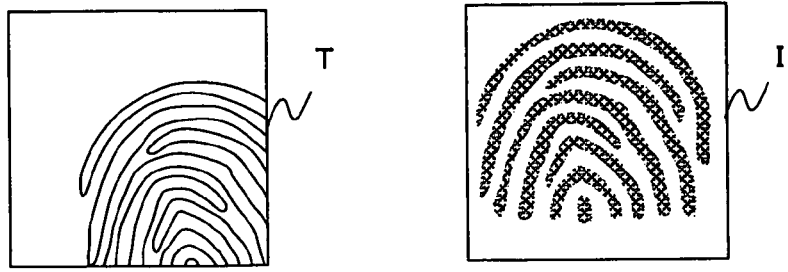
FIG. 6A
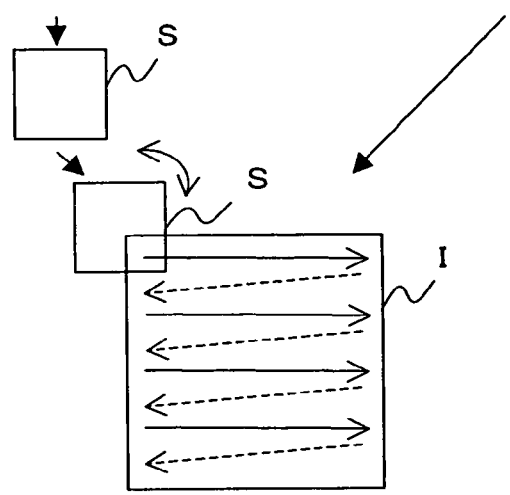
FIG. 6B
FIG. 6C
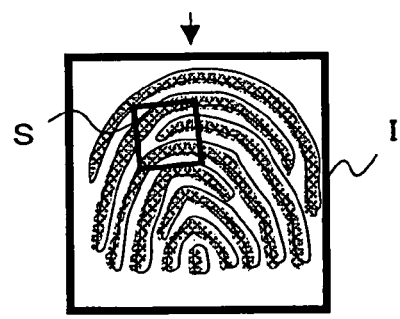
FIG. 6D
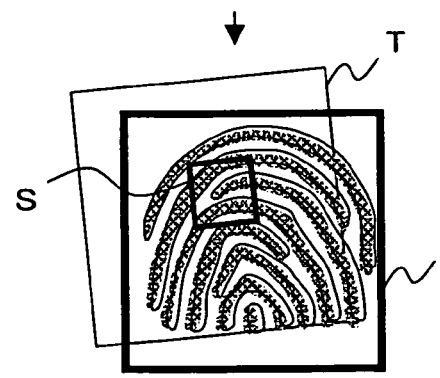
FIG. 6E

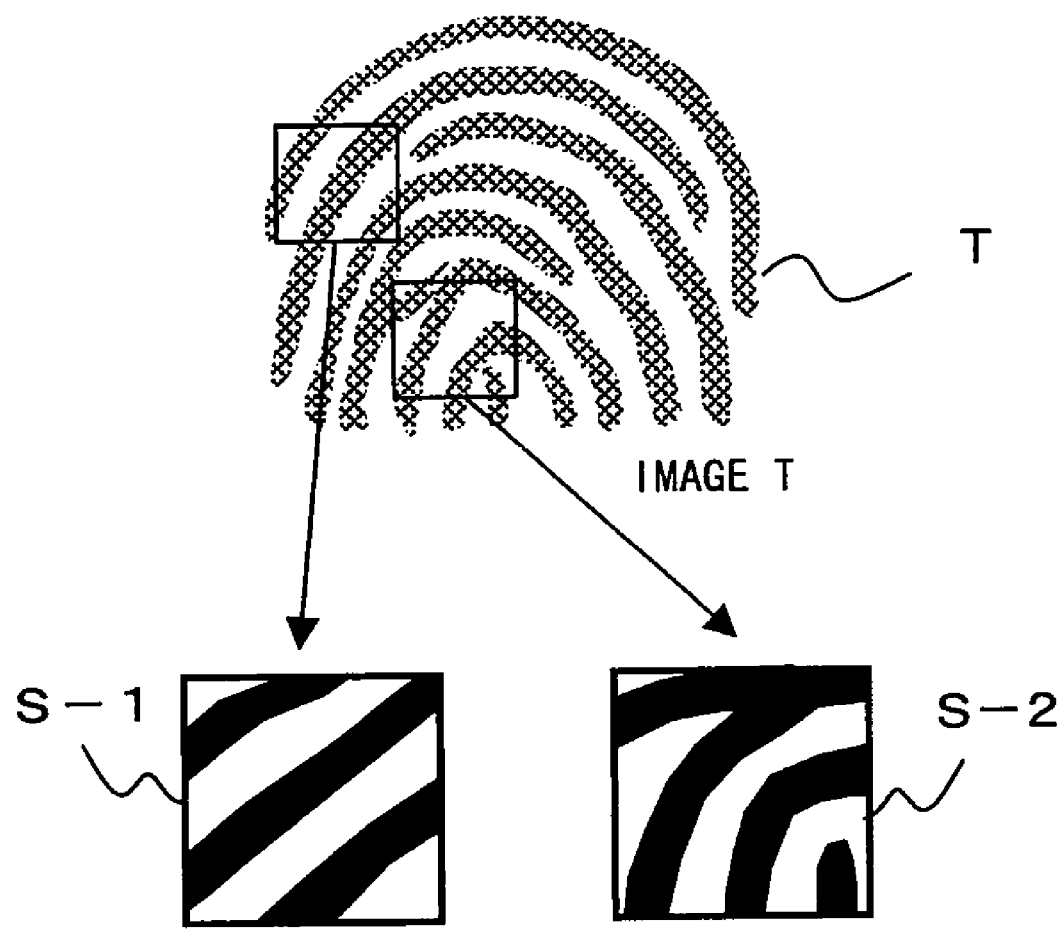
F I G. 7

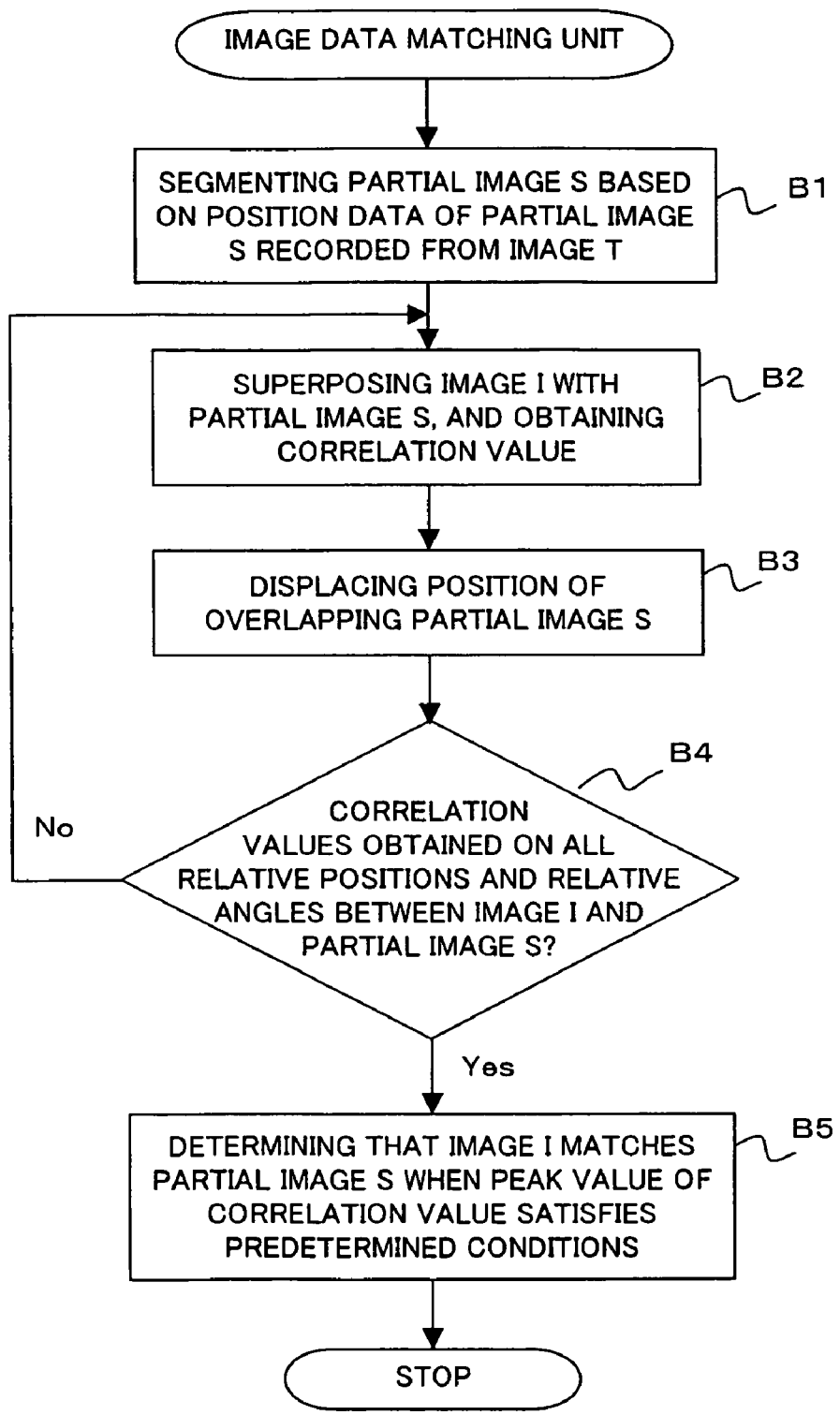
F I G. 1 0

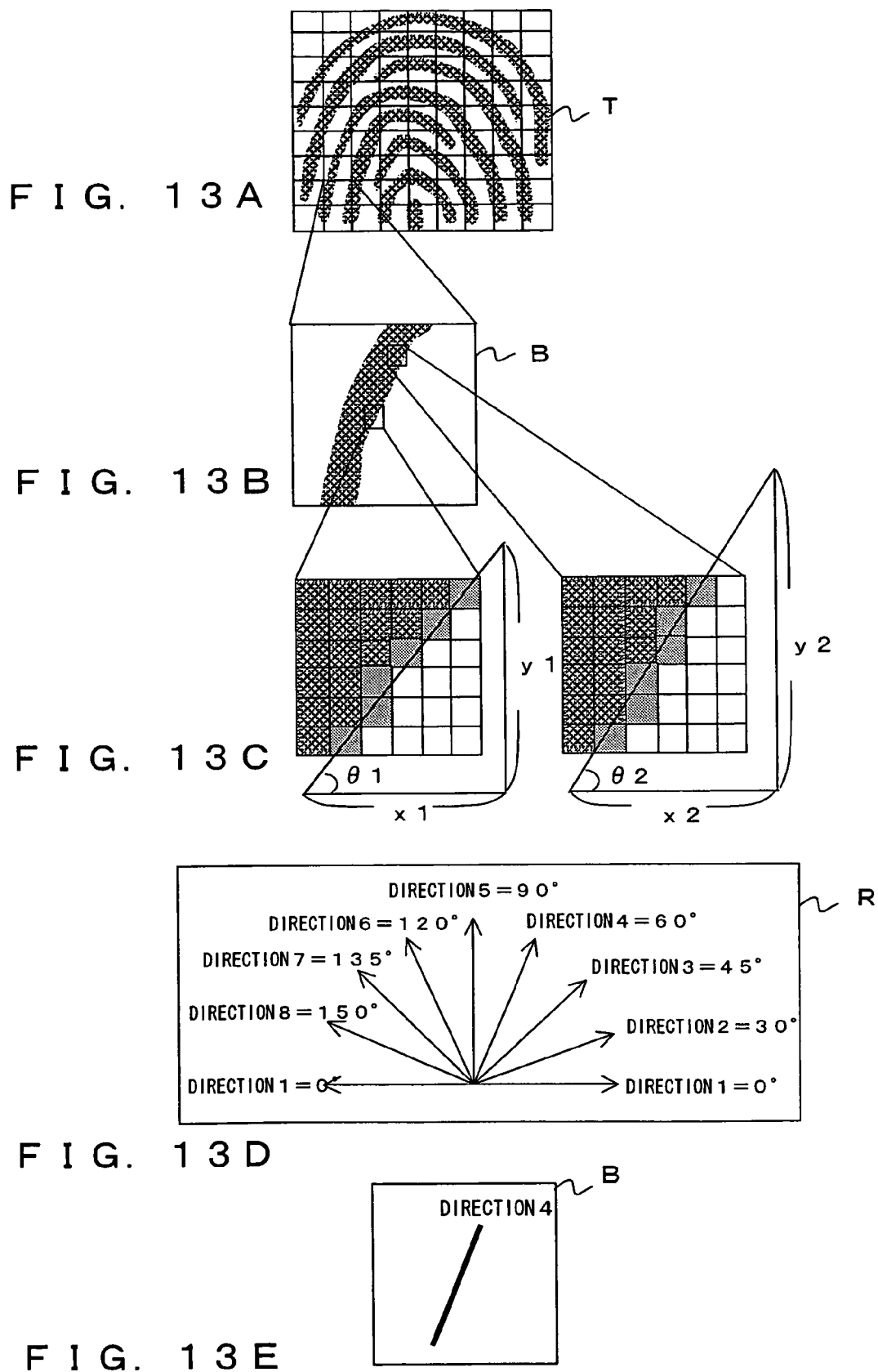

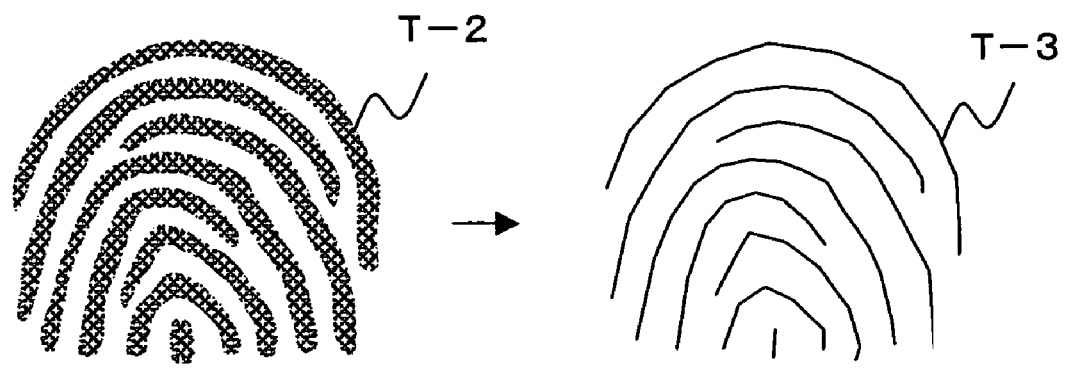
F I G. 1 5 A
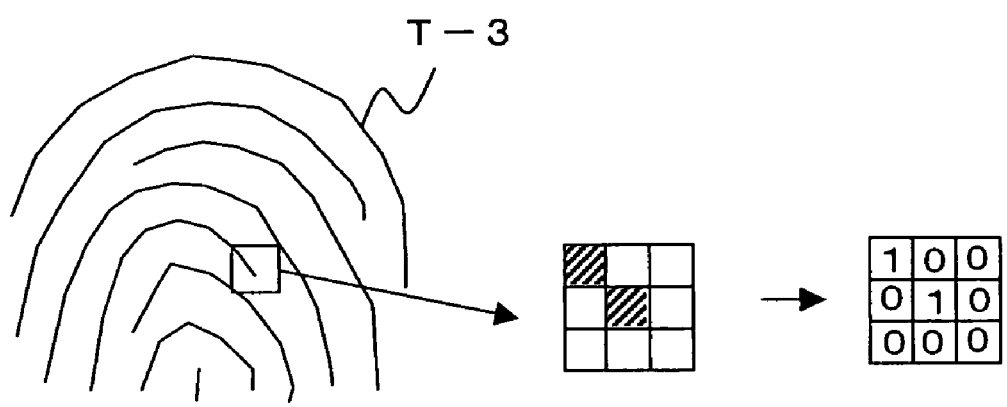
F I G. 1 5 B
F I G. 1 5 C

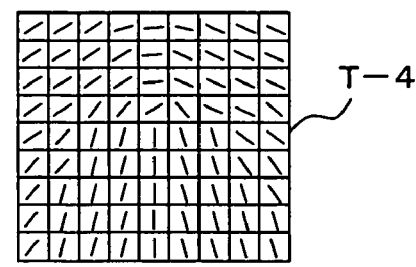
F I G. 2 4 A
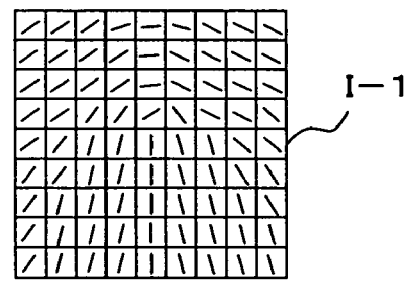
F I G. 2 4 B
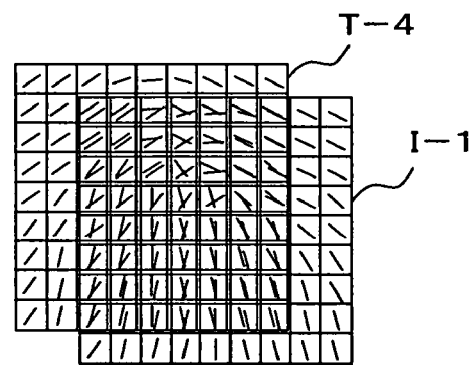
F I G. 2 4 C
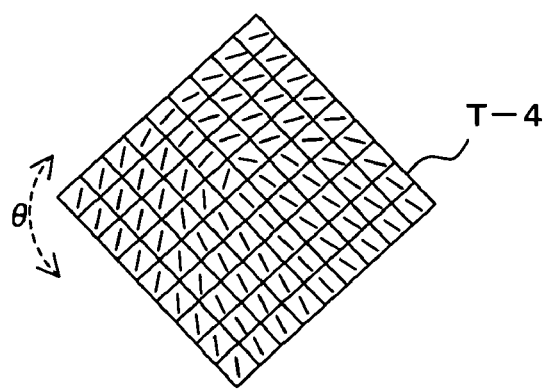
F I G. 2 4 D

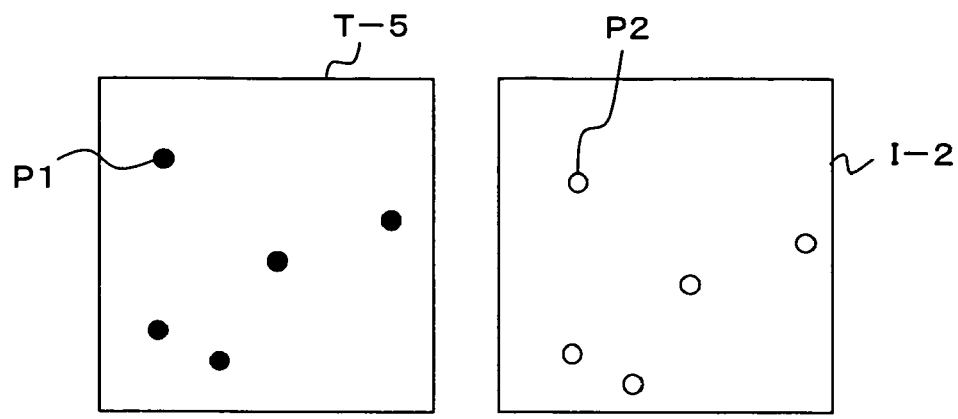
F I G. 2 6 A
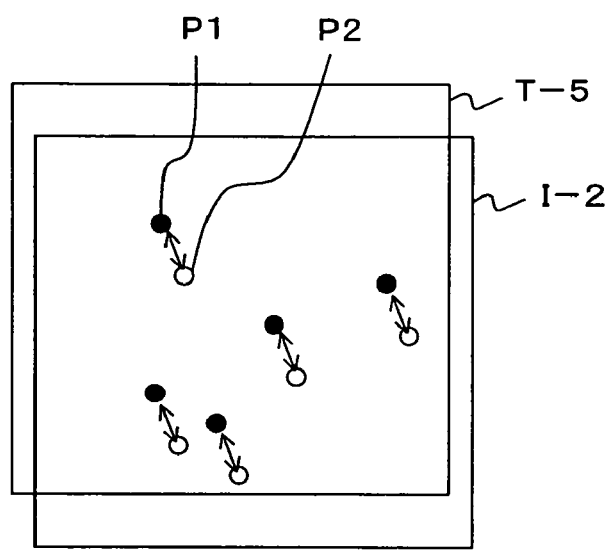
F I G. 2 6 B
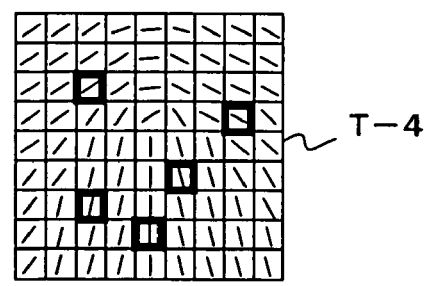
F I G. 2 6 C

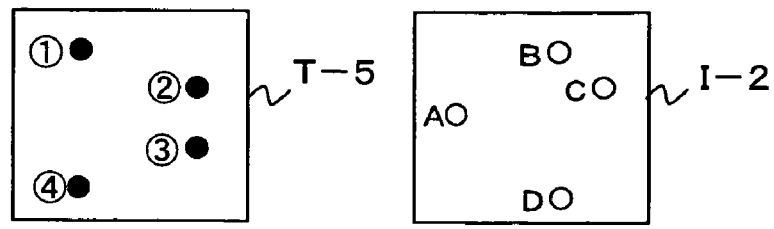
F I G. 2 8 A
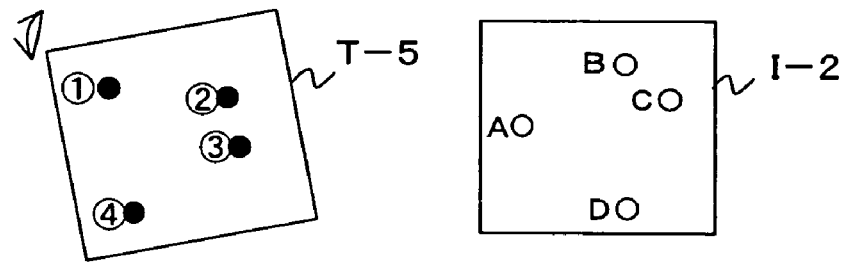
F I G. 2 8 B
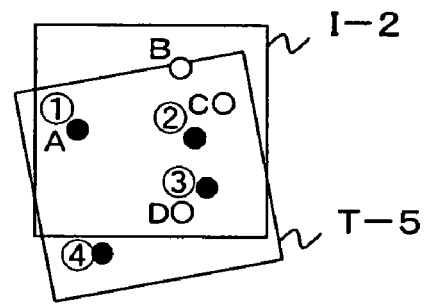
F I G. 2 8 C
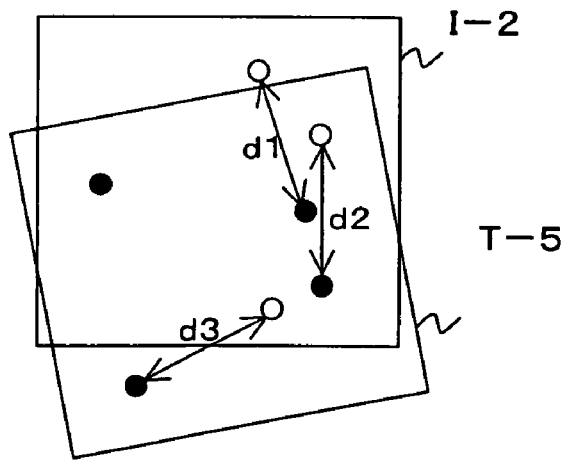
F I G. 2 8 D

IMAGE MATCHING APPARATUS, IMAGE MATCHING METHOD, AND IMAGE MATCHING PROGRAM

CROSS REFERENCE TO RELATED APPLICATION

This application is a continuation of international PCT application No. PCT/JP03/04784 filed on Apr. 15, 2003.

BACKGROUND OF THE INVENTION

1. Field of the Invention

The present invention relates to image matching using a pattern matching method, and more specifically to an image matching apparatus, an image matching method, and an image matching program for matching fingerprint images, etc.

2. Description of the Related Art

When a specific object (an image of a person, a face, a combat car, etc.) is extracted from an image, and a matching operation is performed to check whether or not predetermined images (fingerprint images, face images, iris images, etc.) match, a image matching method that is called a pattern matching method is widely used. In the pattern matching method, the shapes of the characteristic portions and the similar portions in density distribution between a registered image (hereinafter referred to as an image T) and an image to be matched (hereinafter referred to as an image I) are obtained by a correlation arithmetic, etc., and it is evaluated whether or not the closest portions between them match each other. The pattern matching method can be applied to one-dimensional signal recognition such as voice recognition in addition to the two-dimensional signal recognition.

FIG. 1 shows the image matching method using the conventional pattern matching method.

The image matching method shown in FIG. 1 shows an example of a pattern matching method in which fingerprint images are matched.

As shown in FIG. 1A, an image T registered in advance is matched with an image I to be matched. To clarify the overlap between the two images the ridgeline of the image T is shown by a contour only.

As shown in FIG. 1B, the base of the pattern matching method in the image matching is performed by displacing the two images little by little until the position where the largest overlap between the images is obtained can be detected, and the overlap is evaluated.

For example, when the image matching method is used for fingerprint images as shown in FIGS. 1A and 1B, the image T is superposed on the image I, the image T is displaced in the x and y directions little by little until the position where the largest overlap is obtained between the image T and the image I can be detected. At the point where the largest overlap is obtained between the images, the overlap between the images is evaluated. The overlap can be evaluated by, for example, obtaining a product of the number of pixels of the overlapping pixels of the images, and evaluating the sum of the product values of all the overlapping portions. The evaluation value indicating the overlap is the higher when the overlap is the larger. Thus, in the image matching of fingerprint images, etc., when the evaluation value exceeds a predetermined value, it is determined in many cases that the images match.

For example, assuming that the image I is represented by I (x, y) and the image T is represented by T (x, y), the evaluation value V (x, y) for evaluation as to whether or not the images I and T match is expressed by the equation (1).

$$v(x,y) = (1/Z) \Sigma I(i,j) T(i-x, j-y) \quad (1)$$

where Z indicates the area of the overlapping portions between I (i, j) and T (i, j).

In the equation (1) above, the values x and y when the evaluation value V (x, y) is the largest indicate the position where the image T is the closest to the image I, and the evaluation value V (x, y) at that time indicates the degree of overlapping between the image T and I.

When the images T and I are binary images, the above-mentioned T (x, y) and I (x, y) are 0 or 1. The evaluation value V (x, y) at this time can be obtained by the equation (1) above or the following equation (2).

$$v(x,y) = (1/Z) \Sigma \text{not}(I(i,j) \text{ xor } T(i-x, j-y)) \quad (2)$$

where xor indicates an exclusive logical sum, and not indicates negation.

Thus, in the pattern matching method, the arithmetic expression used in a correlation arithmetic operation of image matching can be represented by various arithmetic expressions such as the equations (1) and (2) above, and the arithmetic algorithm is very simple. Therefore, it can be easily implemented on a computer, etc.

When the pattern matching method is applied in matching fingerprint images, and if a finger is dry or sweaty when the finger is pressed against the sensor for reading a fingerprint image, the ridgeline (line indicating the convex portion of a fingerprint) and a valley line (line indicating the concave portion of a fingerprint) can be broken or coupled. Additionally, when a finger is too strongly pressed, or a finger is moved while pressed to a sensor, the image input from the sensor can be fat or distorted. When an image is registered as an image to be matched with a broken or distorted portion included in the image, there occurs the problem of low accuracy for an arithmetic result of an evaluation value.

To solve the above-mentioned problem, for example, an image T and an image I are matched with each other using images of characteristic portions (images of the portions specific in the fingerprint images such as an endpoint indicating the tip point of a ridgeline, a delta indicating the portion from which a ridgeline, etc. is branched, etc., which are referred to as feature points) in the image data of registered fingerprints (for example, refer to the patent document 1 or 2). For example, feature points of an image T are recorded in advance, and an evaluation value for matching can be determined based on the ratio of the number of feature points of the image T to the number of feature points of the image I. Thus, by performing matching of fingerprint images using feature points, etc., the function of identifying each image can be improved. Therefore, the accuracy of evaluation can be enhanced although there is a distortion of a fingerprint image used in matching.

Patent Document 1

Japanese Patent Laid-open Publication No. Hei 6-195448 (pages 8~10, FIGS. 7~18)

Patent Document 2

Japanese Patent Laid-open Publication No. Hei 2-245980 (pages 3~6, FIGS. 1~9)

However, with an increasing number of small computers of late, small sensors are also required for image matching. Although the image matching is performed using feature points, etc., a small sensor provides a small space to which an image is read, and only a small number of feature points can be fetched for the smaller space, thereby causing the problem that sufficient accuracy cannot be obtained.

Furthermore, the conventional image matching method requires a very large number of arithmetic operations for obtaining an evaluation value V (x, y) because of iterative operations of:

1) displacing an image in parallel by one or more pixels; and
2) obtaining a sum of products on all pixels of overlapping portions normally as expressed by the equation (1) or (2) above. As shown in FIG. 2, in addition to displacing an image in parallel pixel by pixel, the amount of rotation can be considered. In this case, one image is rotated little by little while repeating the processes of 1) and 2), thereby further increasing the number of arithmetic operations. Thus, since the conventional image matching method requires a large number of arithmetic operations, it takes a long time to determine whether or not two images match.

The present invention aims at providing an image matching apparatus, an image matching method, and an image matching program capable of shortening the time required to obtain a matching result with high accuracy.

SUMMARY OF THE INVENTION

The image matching apparatus according to the first aspect of the present invention performs matching as to whether or not a first image and a second image match, and includes: a partial image segmentation unit for segmenting a partial image of a predetermined size from the first image; a searching unit for moving the partial image on the second image, and searching for a position of the partial image where the partial image and the second image having a portion overlapping the partial image indicate a largest overlap; an adjustment unit for adjusting a relative position between the second image and the first image based on the position searched for by the searching unit; and a determination unit for determining based on an adjustment result of the adjustment unit as to whether or not the first image matches the second image.

According to the first aspect of the present invention, the relative position between the first and second images is adjusted using a partial image smaller than the first image. Therefore, using the partial image, the number of arithmetic operations can be smaller than that required to perform matching on the entire image, and the time required to obtain a matching result can be shortened.

The image matching apparatus according to the second aspect of the present invention is based on the first aspect, the searching unit moves and rotates the partial image on the second image, and searches for a position and a rotation angle of the partial image where the partial image and the second image having a portion overlapping the partial image indicate a largest overlap, and the adjustment unit adjusts the relative position and the relative angle between the second image and the first image based on the position and the rotation angle searched for by the searching unit.

According to the second aspect of the present invention, the relative position and the relative angle between the first and second images are adjusted using a partial image smaller than the first image. Therefore, using the partial image, the number of arithmetic operations can be smaller than that required to perform matching on the entire image, and the time required to obtain a matching result can be shortened.

The image matching apparatus according to the third aspect of the present invention performs matching as to whether or not a first image and a second image match, and includes: a first recording unit for recording the first image in advance; a partial image segmentation unit for segmenting a partial image of a predetermined size from the first image recorded in the first recording unit; a second recording unit for recording the partial image; a third recording unit for recording the second image received thereby; a searching unit for extracting the predetermined second image from the third recording unit, extracting the partial image corresponding to the first image from the second recording unit, moving the partial image on the second image, and searching for a position of the partial image where the partial image and the second image having a portion overlapping the partial image indicate a largest overlap; an adjustment unit for adjusting a relative position between the second image and the first image based on the position searched for by the searching unit; and a determination unit for determining based on an adjustment result of the adjustment unit as to whether or not the first image matches the second image.

According to the third aspect of the present invention, the operation and effect similar to those according to the first aspect can be obtained.

The image matching apparatus according to the fourth aspect of the present invention performs matching as to whether or not a first image and a second image match, and includes: a first recording unit for recording the first image in advance; a partial image segmentation unit for segmenting a partial image of a predetermined size from the first image recorded in the first recording unit; a second recording unit for recording the partial image; a third recording unit for recording the second image received thereby; a calculation unit for extracting the predetermined second image from the third recording unit, extracting the partial image corresponding to the first image from the second recording unit, and calculating two or more correlation values between the partial image in a position on the second image and the second image of a overlap with the partial image; an adjustment unit for adjusting a relative position between the second image and the first image based on a position of the partial image corresponding to a correlation value satisfying a predetermined condition among the two or more correlation values; and a determination unit for determining based on an adjustment result of the adjustment unit as to whether or not the first image matches the second image.

According to the fourth aspect of the present invention, the operation and effect similar to those according to the first aspect can be obtained.

The image matching apparatus according to the fifth aspect of the present invention performs matching as to whether or not a first image and a second image match, and includes: a partial image segmentation unit for segmenting a partial image of a predetermined size from the first image; a first searching unit for moving the partial image on the second image, and searching for a position of the partial image where the partial image and the second image having a portion overlapping the partial image indicate a largest overlap; a first adjustment unit for adjusting a relative position between the second image and the first image based on the position searched for by the first searching unit; a second searching unit for moving the first image on the second image based on a relative position adjusted by the first adjustment unit, and searching for a position of the first image where the first image and the second image having a portion overlapping the first image indicate a largest overlap; a second adjustment unit for adjusting a relative position between the second image and the first image based on the position searched for by the second searching unit; and a determination unit for determining based on an adjustment result of the second adjustment unit as to whether or not the first image matches the second image.

According to the fifth aspect of the present invention, the relative position between the first and second images is adjusted using a partial image, and based on the adjustment result the relative position between the first and second images is further adjusted using the entire image. Therefore, the image matching can be performed with higher accuracy than by performing image matching using a partial image only.

In the image matching apparatus according to the sixth aspect of the present invention, the first searching unit moves and rotates the partial image on the second image, and searches for a position and a rotation angle of the partial image where the partial image and the second image having a portion overlapping the partial image indicate a largest overlap, the first adjustment unit adjusts the relative position and the relative angle between the second image and the first image based on the position and the rotation angle searched for by the first searching unit, and the second searching unit moves and rotates the first image on the second image based on the relative position and the relative angle adjusted by the first adjustment unit, and searches for a position of the first image where the first image and the second image having a portion overlapping the first image indicate a largest overlap, and the second adjustment unit, and the second adjustment unit adjusts the relative position and the relative angle between the second image and the first image based on the position and the rotation angle searched for by the second searching unit.

According to the sixth aspect of the present invention, the relative position and the relative angle between the first and second images are adjusted using a partial image, and based on the adjustment result the relative position and relative angle between the first and second images are further adjusted using the entire image. Therefore, the image matching can be performed with higher accuracy than by performing image matching using a partial image only.

The image matching apparatus according to the seventh aspect of the present invention performs matching as to whether or not a first image and a second image match, and includes: an extraction unit for extracting first and second feature information from the first and second images; a first adjustment unit for adjusting a relative position between the first and second images according to the first and second feature information; a partial image segmentation unit for segmenting a partial image of a predetermined size from the first image; a first searching unit for moving the partial image on the second image based on the relative position adjusted by the first adjustment unit, and searching for a position of the partial image where the partial image and the second image having a portion overlapping the partial image indicate a largest overlap; a second adjustment unit for adjusting a relative position between the second image and the first image based on the position searched for by the first searching unit; a second searching unit for moving the first image on the second image based on a relative position adjusted by the second adjustment unit, and searching for a position of the first image where the first image and the second image having a portion overlapping the first image indicate a largest overlap; a third adjustment unit for adjusting a relative position between the second image and the first image based on the position searched for by the second searching unit; and a determination unit for determining based on an adjustment result of the third adjustment unit as to whether or not the first image matches the second image.

According to the seventh aspect of the present invention, the relative position between the first and second images is first adjusted by the first adjustment unit, the relative position between the first and second images is then adjusted by the second adjustment unit based on the adjustment result by the first adjustment unit, and the relative position between the first and second images is further adjusted by the third adjustment unit based on the adjustment result by the second adjustment unit, thereby performing image matching with high accuracy.

Since the relative position can be roughly detected by each of the first through third adjustment units, the increasing number of arithmetic operations by the determination unit can be reduced. Thus, the time required to obtain a matching result can be successfully shortened.

In the image matching apparatus according to the eighth aspect of the present invention based on the seventh aspect, the first adjustment unit adjusts the relative position and the relative angle between the first and second images according to the first and second feature information, the first searching unit moves and rotates the partial image on the second image based on the relative position and the relative angle adjusted by the first adjustment unit, and searches for the position and the rotation angle of the partial image where the partial image and the second image having a portion overlapping the partial image indicate the largest overlap, the second adjustment unit adjusts a relative position and the relative angle between the second image and the first image based on the position and the rotation angle searched for by the first searching unit; the second searching unit moves and rotates the first image on the second image based on the relative position and the relative angle adjusted by the second adjustment unit, and searches for the position and the rotation angle of the first image where the first image and the second image having a portion overlapping the first image indicate the largest overlap, and the third adjustment unit adjusts the relative position and the relative angle between the second image and the first image based on the position and the rotation angle searched for by the second searching unit.

According to the eighth aspect of the present invention, the relative position and the relative angle between the first and second images are first adjusted by the first adjustment unit, the relative position and the relative angle between the first and second images are then adjusted by the second adjustment unit based on the adjustment result by the first adjustment unit, and the relative position and the relative angle between the first and second images are further adjusted by the third adjustment unit based on the adjustment result by the second adjustment unit, thereby performing image matching with high accuracy.

Since the relative position and the relative angle can be roughly detected by each of the first through third adjustment units, the increasing number of arithmetic operations by the determination unit can be reduced. Thus, the time required to obtain a matching result can be successfully shortened.

The image matching method according to the ninth aspect of the present invention performs matching as to whether or not a first image and a second image match, and includes: a partial image segmenting step of segmenting a partial image of a predetermined size from the first image; a searching step of moving the partial image on the second image, and searching for a position of the partial image where the partial image and the second image having a portion overlapping the partial image indicate a largest overlap; an adjustment step of adjusting a relative position between the second image and the first image based on the position searched for in the searching step; and a determining step of determining based on an adjustment result in the adjusting step as to whether or not the first image matches the second image.

According to the ninth aspect of the present invention, the relative position between the first and second images is adjusted using a partial image smaller than the first image. Therefore, using the partial image, the number of arithmetic operations can be smaller than that required to perform matching on the entire image, and the time required to obtain a matching result can be shortened.

An image matching program according to the tenth aspect of the present invention is used to direct a computer to perform matching as to whether or not a first image and a second image match by functioning as the units including: a partial image segmentation unit for segmenting a partial image of a predetermined size from the first image; a searching unit for moving the partial image on the second image, and searching for a position of the partial image where the partial image and the second image having a portion overlapping the partial image indicate a largest overlap; an adjustment unit for adjusting a relative position between the second image and the first image based on the position searched for by the searching unit; and a determination unit for determining based on an adjustment result of the adjustment unit as to whether or not the first image matches the second image.

According to the tenth aspect of the present invention, the relative position between the first and second images is adjusted using a partial image smaller than the first image. Therefore, using the partial image, the number of arithmetic operations can be smaller than that required to perform matching on the entire image, and the time required to obtain a matching result can be shortened.

The image matching apparatus according to the eleventh aspect of the present invention is based on one of the first, fifth, and seventh aspects, and the partial image segmentation unit segments the partial image from around the center of the first image.

According to the eleventh aspect of the present invention, for example, when fingerprint images are matched with each other, there is the strong possibility that the central portions of the fingerprint images contain feature points (an endpoint, a branch point, etc.), and therefore a matching result with high accuracy can be obtained.

The image matching apparatus according to the twelfth aspect of the present invention is based on one of the first, fifth, and seventh aspects, and the partial image segmentation unit calculates two or more correlation values between a partial image arbitrarily segmented from the first image and a portion overlapping the first image, and the searching unit uses a partial image indicating the largest correlation value among the two or more correlation values.

According to the twelfth aspect, for example, there is the strong possibility that a partial image contains a feature point, and therefore a matching result with high accuracy can be obtained.

The image matching apparatus according to the thirteenth aspect of the present invention is based on one of the first, fifth, and seventh aspects, and the searching unit moves the partial image from around the center of the second image, and searches for the position of the partial image where the partial image and the second image having a portion overlapping the partial image indicate the largest overlap.

According to the thirteenth aspect of the present invention, when the relative position and the rotation angle are to be adjusted only a little between the first and second images, the number of arithmetic operations can be smaller, and the time required to obtain a matching result can be shortened.

The image matching apparatus according to the fourteenth aspect of the present invention is based on one of the first, fifth, and seventh aspects, and the partial image segmentation unit segments two or more partial images of a predetermined size from the first image.

According to the fourteenth aspect of the present invention, it shows the same effect as that in performing a matching operation widely using one partial image by using a plurality of partial images. Therefore, the accuracy of image matching can be enhanced than by using only one partial image.

The image matching apparatus according to the fifteenth aspect of the present invention is based on the fourteenth aspect, and the partial image segmentation unit calculates each correlation value between two or more partial images arbitrarily segmented from the first image and the image of the portion overlapping the first image, and the searching unit uses the partial image when the correlation value is large.

According to the fifteenth aspect of the present invention, for example, there is a strong possibility that two or more partial images contain the feature points of fingerprint images, thereby obtaining a matching result with high accurate.

The image matching apparatus according to the sixteen aspect of the present invention is based on one of the first, fifth, and seventh aspects, and the determination unit divides the first and second images, and determines whether or not the first and second image match in each of the divided areas.

According to the sixteenth aspect of the present invention, image matching can be performed with high accuracy on the distortion generated on a part of an image. When fingerprint images are matched with each other, it is especially effective because of the possible expansion and shrinkage of the skin. The image matching apparatus according to the seventeenth aspect of the present invention is based on one of the first, fifth, and seventh aspects, and the first and second images are configured by fingerprint images, iris images, face images, palm images, or vein images.

As in the seventeenth aspect of the present invention, the first and second images can be configured by fingerprint images, iris images, face images, palm images, or vein images.

The image matching apparatus according to the eighteenth aspect of the present invention is based on the seventh aspect, and the first and second images are fingerprint images, the extraction unit converts the first and second images to a ridgeline direction distribution view or a valley line direction distribution view, and the first and second feature information are extracted from the ridgeline direction distribution view or the valley line direction distribution view.

According to the eighteenth aspect of the present invention, in the image matching on fingerprint images, the image matching can be performed with high accuracy.

BRIEF DESCRIPTION OF THE DRAWINGS

The present invention can be more clearly described by referring to the following attached drawings together with more detailed explanation given later.

FIGS. 6A through 6E show an example of a rough adjustment using a partial image according to the first embodiment of the present invention;

FIG. 7 shows an example a method of extracting a partial image according to the first embodiment of the present invention;

FIG. 10 is a flowchart for explanation of the operation of the image data matching unit according to the first embodiment of the present invention;

FIGS. 13A through 13E are an explanatory view of the method for generating a ridgeline direction distribution view;

FIG. 15A through 15C show an example of registered image data according to the second embodiment of the present invention;

FIGS. 24A through 24D show an example of registered image data according to the seventh embodiment of the present invention;

FIGS. 26A through 26C show an example of registered image data according to the eighth embodiment of the present invention;

FIGS. 28A through 28D show an example of registered image data according to the eighth embodiment of the present invention;

DESCRIPTION OF THE PREFERRED EMBODIMENT

The embodiments of the present invention are explained below by referring to the attached drawings.

Figure 1A:
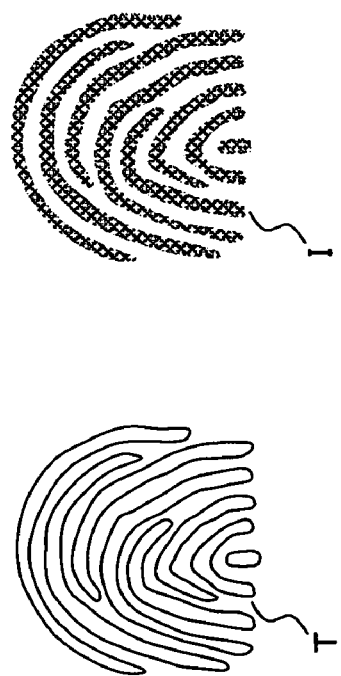
FIGS. 1A and 1B show the conventional image matching method.
Figure 1B:
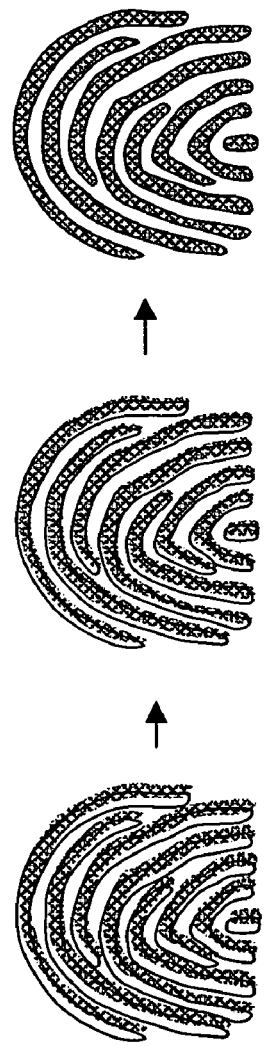
Figure 2:
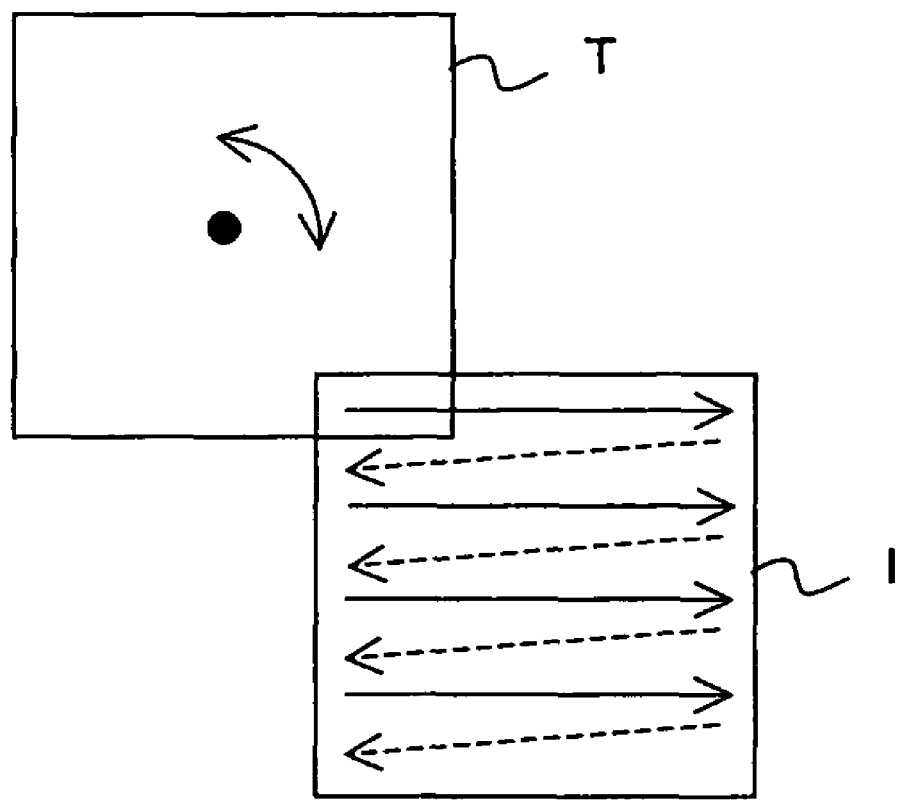
FIG. 2 shows the conventional image matching method.
Figure 3:
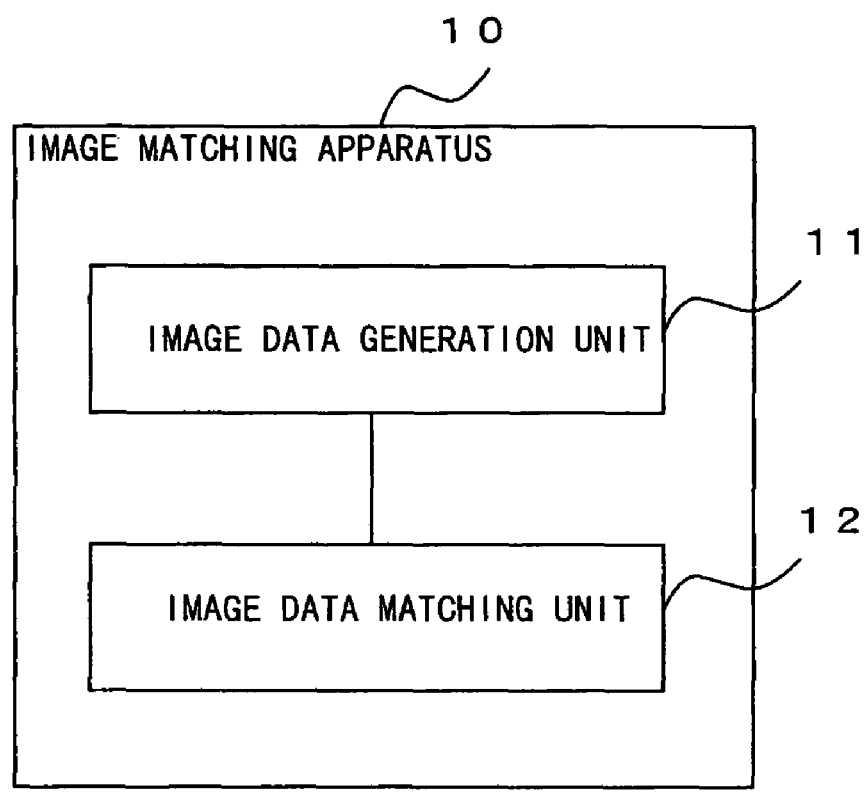
FIG. 3 is a block diagram showing the configuration of the image matching apparatus according to an embodiment of the present invention.

FIG. 3 is a block diagram showing the configuration of the image matching apparatus according to an embodiment of the present invention.

As shown in FIG. 3, an image matching apparatus 10 comprises an image data generation unit 11 for generating image data (image T) and image data (image I) to be checked for registration from input images, and an image data matching unit 12 for performing a matching operation to determine whether or not the image T and the image I generated by the image data generation unit 11 match. The image data generation unit 11 and the image data matching unit 12 can be configured in the same apparatus, also the image data generation unit 11 can be provided on a client side between the client and a server over a network, and the image data matching unit 12 can be provided on the server side. Additionally, the image data generation unit 11 can be provided on the client side, and the image data generation unit 11 and the image data matching unit 12 can be provided on the server side. Thus, various configurations can be devised.

Figure 4:
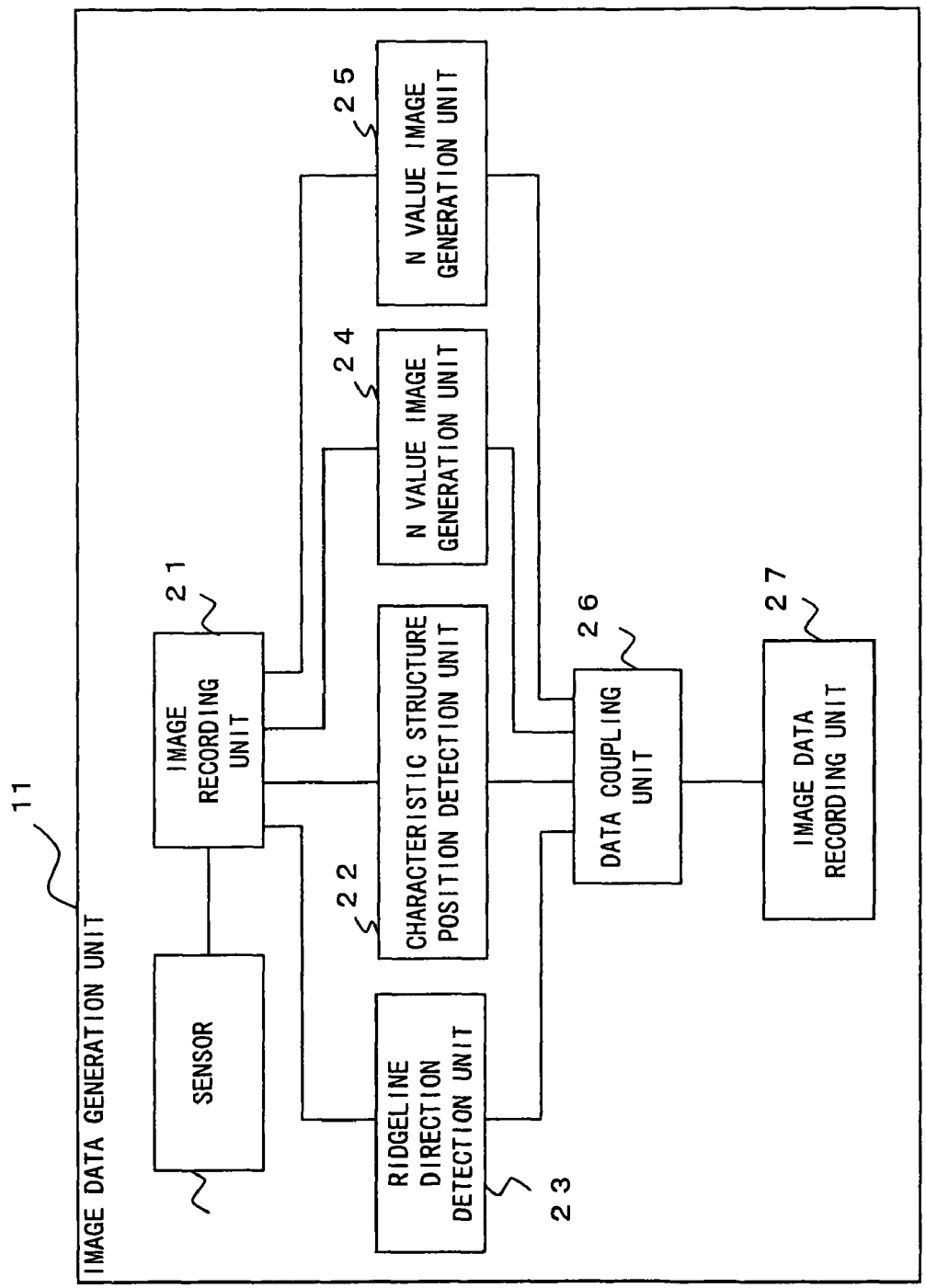
FIG. 4 is a block diagram showing the configuration of the registered image data generation unit.

FIG. 4 is a block diagram showing the configuration of the registered image data generation unit.

As shown in FIG. 4, the image data generation unit 11 comprises: a sensor 20 for inputting a predetermined image (for example, a fingerprint image, an iris image, a face image, a palm image, a vein image, etc.), an image recording unit 21 for recording an image input from the sensor 20; a characteristic structure position detection unit 22 for detecting the position of an image of a portion having a characteristic structure (for example, a fingerprint ridgeline, the muscle of an iris, an eye, an ear or vein having a large curvature of a contour) from the image recorded on the image recording unit 21; a ridgeline direction detection unit 23 for detecting the ridgeline direction from the image when the image recorded on the image recording unit 21 is a fingerprint image; an n value image generation unit 24 for generating an n value image (n≧2, n=integer) based on the image recorded on the image recording unit 21; a feature point position detection unit 25 for detecting the position of a feature point from an image when the image recorded on the image recording unit 21 is a fingerprint image; a data coupling unit 26 for generating preferable image data by coupling the image data obtained by the characteristic structure position detection unit 22, the ridgeline direction detection unit 23, the n value image generation unit 24, and the feature point position detection unit 25; and an image data recording unit 27 for recording the image data generated by the data coupling unit 26. It is not necessary for the ridgeline direction detection unit 23, the n value image generation unit n value image generation unit 24, and the feature point position detection unit 25 to simultaneously exist, but various configurations can be designed.

Figure 5:
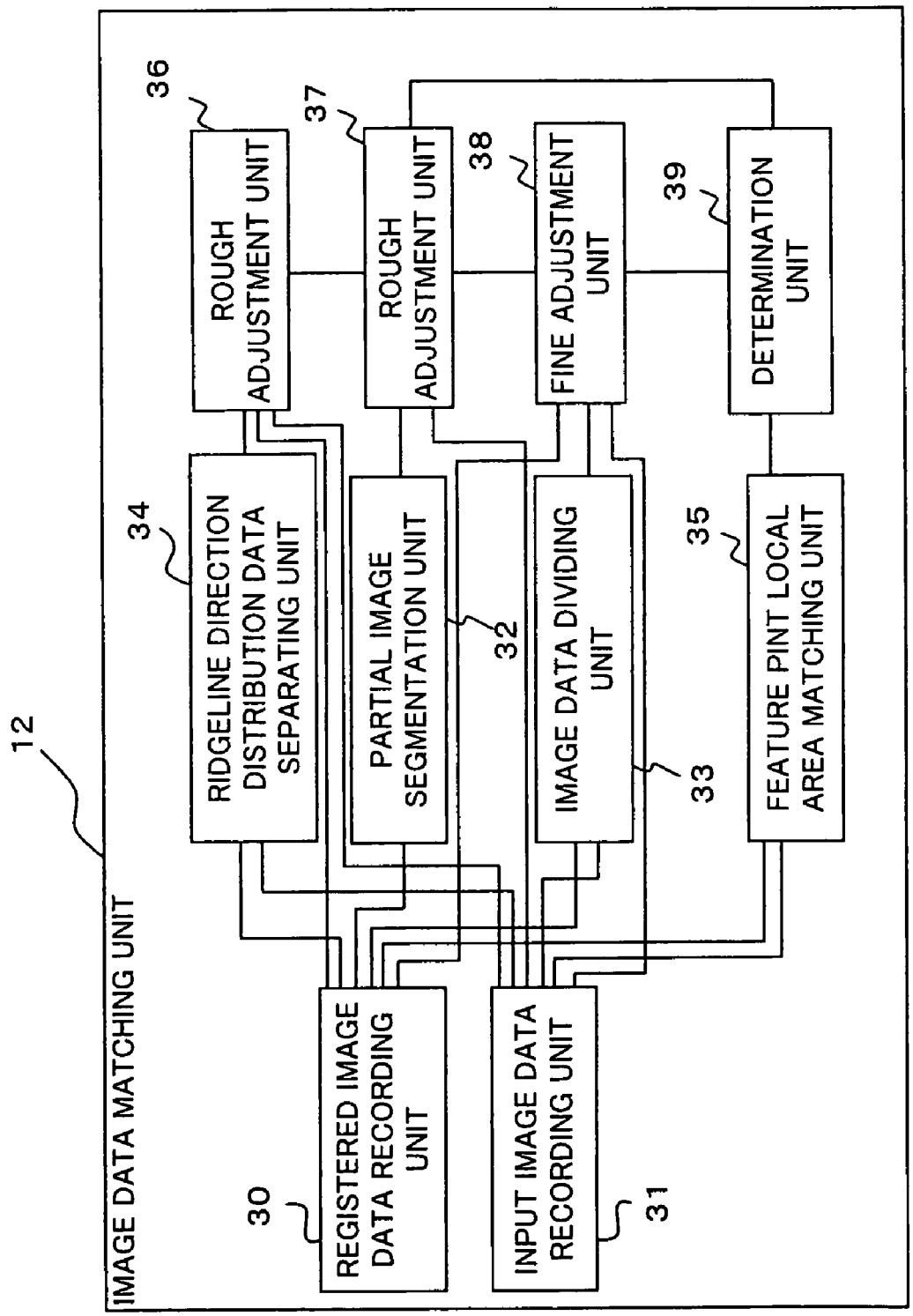
FIG. 5 is a block diagram showing the configuration of the image data matching unit.

FIG. 5 is a block diagram showing the configuration of the image data matching unit 12.

As shown in FIG. 5, the image data matching unit 12 comprises: a registered image data recording unit 30 for recording image data for registration (image T); an input image data recording unit 31 for recording image data to be matched with (image I); a partial image segmentation unit 32 for segmenting a partial image from predetermined image data recorded on the registered image data recording unit 30; an image data dividing unit 33 for dividing predetermined image data recorded on the registered image data recording unit 30 or the input image data recording unit 31 into images of a predetermined size; a ridgeline direction distribution data separating unit 34 for extracting image data indicating the distribution in the ridgeline direction from the image data when the image data recorded on the registered image data recording unit 30 or the input image data recording unit 31 is fingerprint image data; a feature point local area matching unit 35 for performing a matching operation based on the image data in a predetermined area with the centered feature point using the feature point position recorded on the image matching when the image data recorded on the registered image data recording unit 30 or the input image data recording unit 31 is fingerprint image data; a rough adjustment unit 36 for adjusting the relative position between the registered image data and the input image data according to the image data recorded on the registered image data recording unit 30 or the input image data recording unit 31 and the image data obtained by the ridgeline direction distribution data separating unit 34; a rough adjustment unit 37 for adjusting the relative position between registered image data and input image data based on the image data obtained by the partial image segmentation unit 32 and the input image data recording unit 31 and the relative position obtained by the rough adjustment unit 36; a fine adjustment unit 38 for adjusting the relative position between registered image data and input image data based on the image data recorded on the registered image data recording unit 30 or the input image data recording unit 31, the image data obtained by the image data dividing unit 33, and the relative position obtained by the rough adjustment unit 37; and a determination unit 39 for determining whether or not two pieces of image data adjusted by the rough adjustment unit 37 or the fine adjustment unit 38 match.

First Embodiment

The first embodiment of the present invention is the basic component of the image matching apparatus, the image matching method, and the image matching program.

As shown in FIG. 6A, an image T is matched with an image I.

First, as shown in FIG. 6B, to adjust the relative position relationship or the relative rotation angle relationship between the image T and the image I, a partial image S is segmented from the image T. The method for determining the position of the partial image S is described later.

As shown in FIG. 6C, correlation arithmetic is performed using a partial image S and an image I. That is, a correlation value (a value indicating the overlap between two images) is calculated while displacing the relative position between the partial image S and the image I by n pixels (n indicates an integer of 1 or larger). Furthermore, the rough adjustment is similarly performed while rotating the partial image S little by little. The correlation value can be, for example, a sum of products of pixel values is used for a multivalued image, and a ratio of the number of pixels matching in pixel value is used for a binary image.

As shown in FIG. 6D, the relative position coordinates (hereinafter referred to simply as a relative position) and the relative rotation angle (hereinafter referred to simply as a relative angle) between the partial image S and the image I are obtained when the highest correlation value is finally obtained.

As shown in FIG. 6E, the image T and the image I are superposed using the obtained relative position and relative angle.

Then, the correlation value between the image T and the image I is obtained using each of the entire image. The method for calculating the correlation value can be the same as that for calculating the correlation value using the partial image S and the image I. When the evaluation value satisfies a predetermined condition, it is determined that the image T matches the image I.

Described below is the method for determining the position of the partial image S segmented from the image T.

The partial image S is used in obtaining the relative position and relative angle between the image T and the image I, and it is necessary for the partial image S to be a value enabling the relative position and the relative angle to be obtained with high accuracy.

For example, when a fingerprint image as shown in FIG. 7 is to be matched, and the image such as the partial image S-1 is selected, it is difficult to obtain the relative position and the relative angle with high accuracy using the partial image S-1 because there are a number of similar images (elements) among the fingerprint images. Meanwhile, when an image such as the partial image S-2 is selected, a characteristic structure (for example, a feature point) is contained. Therefore, the relative position and the relative angle can be obtained with high accuracy. When an image other than a fingerprint image, for example, a landscape image is used, it is desired that the partial image S is selected as including a bird, the top of a mountain, a tree, etc.

Thus, as a condition in segmenting a partial image S from an image T, it is desired that a portion of a characteristic structure is included in the partial image S.

Figure 8A:
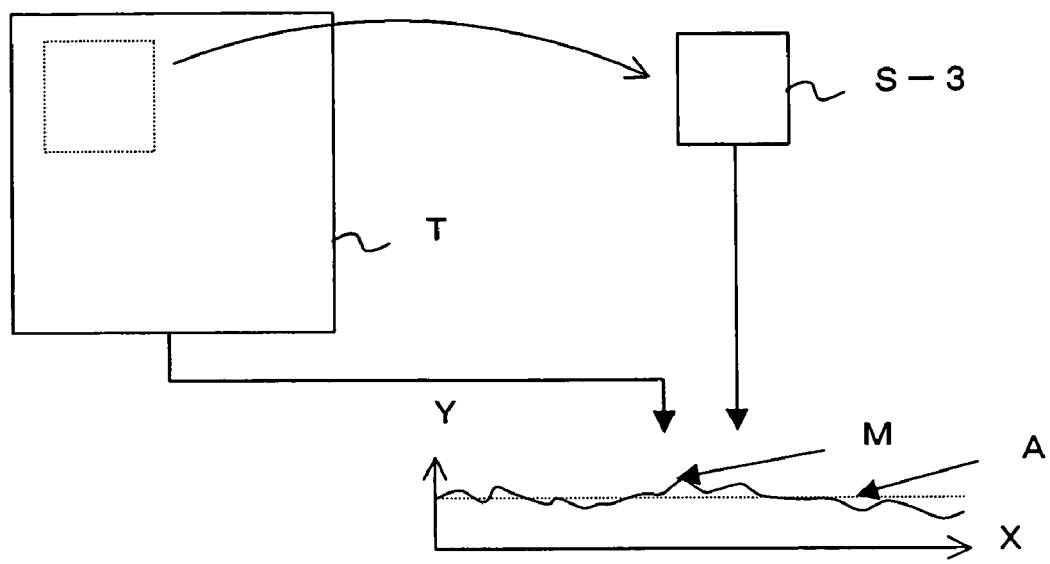
FIGS. 8A and 8B show an example a method of extracting a partial image according to the first embodiment of the present invention.
Figure 8B:
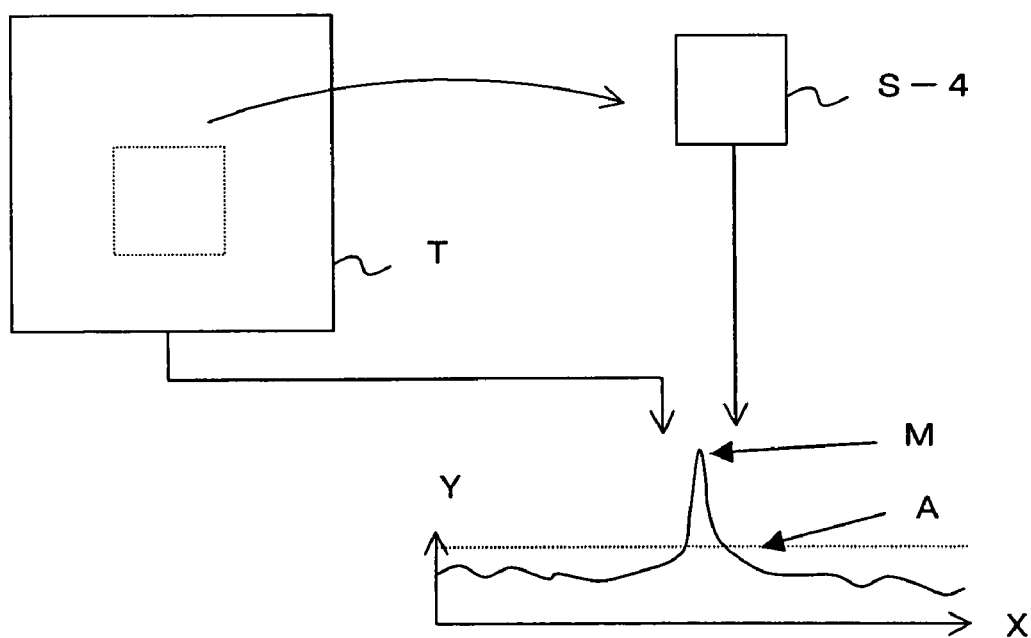

In the case of common image matching using a landscape image, etc., a correlation value between the partial image S and the image T is obtained, and a largest change in correlation value is selected. For example, FIG. 8 shows the state indicating a change in correlation value for two partial images S-3 and S-4 segmented from different segmentation points. The vertical axis of the graph shown in FIGS. 8A and 8B indicates the correlation value Y, and the horizontal axis indicates the amount of displacement X of the partial image. A indicates the average value of the correlation value Y.

As shown in FIG. 8A, assume that a change in correlation value is moderate when a predetermined partial image S-3 is segmented from the image T, and the correlation value between the image T and the partial image S-3 is obtained. That is, assume that the correlation value has no relatively high peak value M. Thus, a poor change in correlation value refers to the variance of images similar to the segmented partial image S-3 in the image T. Therefore, it is not a suitable partial image for search.

Meanwhile, assume that, as shown in FIG. 8B, a partial image S-4 is segmented from the image T from a point different from the point shown in FIG. 8A, and when a correlation value between the image T and the partial image S-4 is obtained, a large change in correlation value is made, and a high peak value M of the correlation value is obtained. In this case, the partial image S-4 includes a characteristic structure of the image T, and it is suitable as a partial image for search.

That is, the partial image S-4 is suitable for obtaining the relative position and the relative angle between the image T and the image I.

Thus, between the image T and the partial image S, when a large change in correlation value occurs, the partial image S includes a characteristic structure of the image T.

Figure 9:
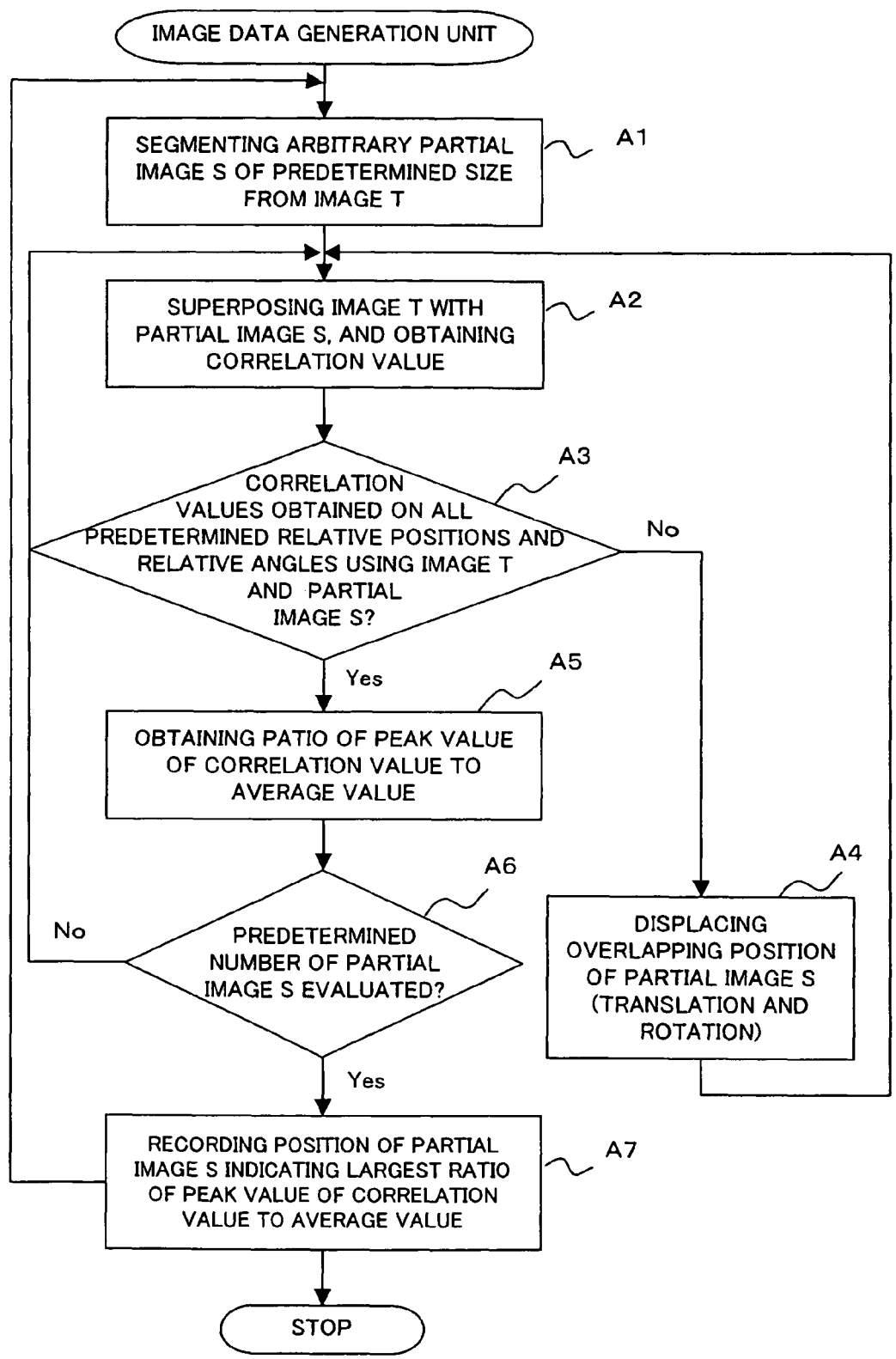
FIG. 9 is a flowchart for explanation of the operation of the registered image data generation unit according to the first embodiment of the present invention.

FIG. 9 is a flowchart for explanation of the operation of the image data generation unit 11.

First, in step A1, the characteristic structure position detection unit 22 extracts a predetermined image T from the image recording unit 21, and segments an arbitrary partial image S of a predetermined size from the image T.

In step A2, the characteristic structure position detection unit 22 superposes the image T and the partial image S, and obtains a correlation value indicating the degree of overlapping between the image T and the partial image S.

In step A3, the characteristic structure position detection unit 22 determines whether or not all correlation values have been obtained on all predetermined relative positions and relative angles when the image T overlaps the partial image S.

When all predetermined correlation values are not obtained (No in step A3), in step A3, the characteristic structure position detection unit 22 displaces the position of the partial image S, and control is returned to step A2.

An example of a practical arithmetic expression of the correlation value between the image T and the partial image S is shown below.

When the image T is T (x, y), the image S is S (x, y), and the correlation value is V (x, y), the following equation (3) holds.

$$v(x,y)=(1/Z)\Sigma S(i,j)T(i-x,j-y) \quad (3)$$

where Z indicates the area of the portions overlapping between S (i, j) and T (i–x, j–y). It is desired that T (x, y) and S (x, y) are normalized to average of 0 and variance of 1.

When the image T is T (x, y), the image S is S (x, y), the correlation value is V (x, y), the value area of T (x, y) and S (x, y) is 0 or 1, the following equation (4) holds.

$$v(x,y)=(1/Z)\Sigma \text{not}(S(i,j) \text{xor} T(i-x,j-y)) \quad (4)$$

where Z refers to the area of the overlapping portions of S (i, j) and T (i–x, j–y), xor refers to an exclusive logical sum, and not refers to negation. In each image of S (x, y) and T (x, y), it is desired that the entire image is adjusted to have substantially equal numbers of pixel values 0 and 1.

When the image T and the partial image S are binary images in the equations (3) and (4) above, the number of matching pixels between the image T and the partial image S is simply counted. At this time, between the image T and the partial image S, the number of matching pixels for determination of matching is normally much larger than the number of non-matching pixels. Therefore, the number of arithmetic operations can be reduced by counting the number of non-matching pixels instead of counting the number of matching pixels, and aborting the calculation when it is determined that the image T does not match the image S.

Meanwhile, when all correlation values are obtained (Yes in step A3), in step A5, the characteristic structure position detection unit 22 obtains the ratio of the peak value in the obtained correlation values to the average value of the obtained correlation values.

Then, in step S6, the characteristic structure position detection unit 22 determines whether or not the ratios of the peak value of the correlation value to the average value are obtained for all the predetermined number of partial images S.

When the ratios of the peak value of the correlation value to the average value are not obtained for all the predetermined number of partial images S (No in step A6), control is returned to step A2, and the another partial image S which has not been processed is evaluated.

When all partial images S are evaluated (YES in step A6), the characteristic structure position detection unit 22 records in the image data recording unit 27 the position data (coordinates, etc.) of the partial image S indicating the highest ratio of the peak value of the obtained correlation values to the average value.

Thus, the method of detecting the partial image S performs correlation arithmetic between the image T and some partial images S, and in a plurality of correlation values, a partial image S based on the correlation value corresponding to a large change in correlation value can be used as a partial image S for registration.

Described below is the operation of the image data matching unit 12 when the position data of the registered partial image S is used.

FIG. 10 is a flowchart for explanation of the operation of the image data matching unit 12 when the position data of the partial image S is used.

First, in step B1, the partial image segmentation unit 32 extracts the position data of the partial image S recorded in step A7 shown in FIG. 9 from the registered image data recording unit 30, and segments the partial image S from the image T based on the position data. (refer to FIGS. 6A and 6B).

Then, in step B2, the rough adjustment unit 37 extracts the image I from the input image data recording unit 31, superposes the image I and the partial image S, and obtains the correlation value. (refer to FIG. 6C).

In step B3, the rough adjustment unit 37 displaces the position of the partial image S. (refer to FIG. 6C).

Then, in step B4, the rough adjustment unit 37 determines whether or not the correlation values have been obtained for all predetermined relative positions and relative angles between the image I and the partial image S.

If all predetermined correlation values have not been obtained yet (No in step B4), control is returned to step B2, and necessary values are obtained. The arithmetic expression for the correlation values between the image I and the partial image S can be expressed by the equation (3) or (4) above.

If all predetermined correlation values have been obtained (Yes in step B4), then in step B5, the rough adjustment unit 37 determines, when the largest correlation value in the correlation values obtained in the steps from B2 to B4 satisfies a predetermined condition, the position data of the partial image S indicating the largest overlap between the image I and the partial image S.

Then, the determination unit 39 superposes the image I and the image T based on the position data obtained in step B5, calculates the correlation value between the image I and the image T, and determines that the image I and the image T match if the correlation value between the image I and the image T is larger than a predetermined value. The arithmetic expression for the correlation value between the image I and the image T can be expressed by the equation (3) or (4), etc.

Thus, the partial image S segmented by the partial image segmentation unit 32 is used in obtaining the optimum relative position and relative angle between the image I and the image T. Therefore, it is necessary that the relative position and the relative angle can be obtained with high accuracy using the partial image S.

Thus, in the first embodiment, while a matching operation is being performed on two images, a partial image S is registered in advance, the relative position and the relative angle are obtained when the largest overlap is obtained between the partial image S and the image I, the image T and the image I are superposed based on the obtained relative position and the relative angle, and determines whether or not the image T matches the image I. Meanwhile, in the existing image matching method, the correlation values between the image T and the image I are obtained in the range of all images, and it is determined whether or not the image T matches the image I based on the obtained correlation values. Normally, in matching fingerprint images, it is desired that the time required to determine whether or not the image T matches the image I is the shortest possible. However, the time required to register the image T can be longer. In the first embodiment, the optimum relative position and relative angle are designated between the image I and the image T using a partial image S smaller than the image T (entire image). Therefore, the smaller image can reduce the number of arithmetic operations required to designate the position where the two images refer to the largest overlap. Thus, the image matching according to the first embodiment can shorten the time required to obtain a matching result than the matching on the entire image.

Second Embodiment

In the second embodiment of the present invention, the practical method for extracting a partial image S in matching fingerprint images is described. When fingerprint images are matched, the position of the partial image S to be segmented from the image T can be set as follows to obtain the relative position and relative angle between the image T and the image I with high accuracy.

1. Center (indicating a large curvature of the ridgeline on the entire fingerprint image) and delta 2. Feature point (endpoint, branch point).

First, assume the case in which "1. center and delta" is included in the partial image S.

Figure 11:
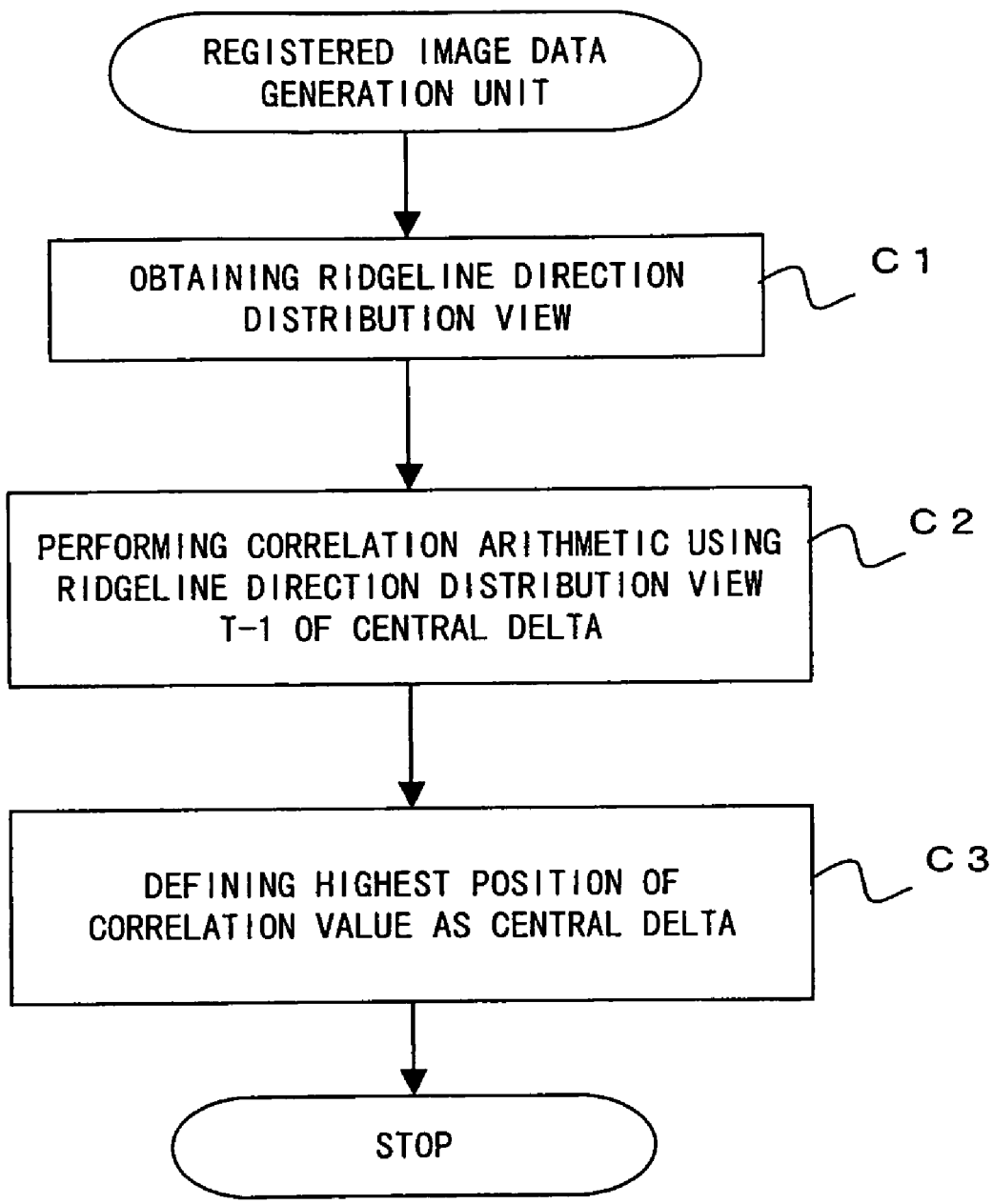
FIG. 11 is a flowchart for explanation of the operation of the registered image data generation unit according to the second embodiment of the present invention.

FIG. 11 is a flowchart for explanation of the operation of the image data generation unit 11 when "1. center and delta" is included in the partial image S.

Figure 12A:
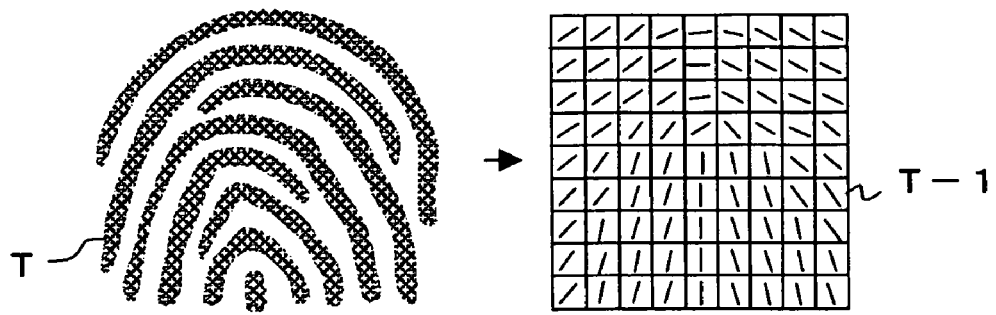
FIGS. 12A though 12C show an example of registered image data according to the second embodiment of the present invention.

First, in step C1, the ridgeline direction detection unit 23 extracts a predetermined image T from the image recording unit 21, and obtains the ridgeline direction distribution view T-1 from the image T (refer to FIG. 12A). A valley line direction distribution view can be generated.

FIG. 13 is an explanatory view of generating a ridgeline direction distribution view.

First, as shown in FIG. 13A, the image T is divided into an arbitrary number of blocks, for example, n×n blocks.

Then, as shown in FIGS. 13B and 13C, using a plurality of pixels forming the edge of the ridgeline shown in each of the divided blocks B, a predetermined number of tilt angles of pixels at predetermined intervals are obtained. That is, for example, in the example shown in FIG. 13C, in the pixel group forming the edge of the ridgeline, six consecutive pixels are selected, and the angle of the tilt of the straight line connecting the end pixels of the six pixels is obtained (for example, $\theta 1 = \tan^{-1}(y1/x1)$, $\theta 2 = \tan^{-1}(y2/x2)$).

Next, FIG. 13D is an angle/direction correspondence view R showing the correspondence between a predetermined angle and a corresponding direction. An average angle is obtained from a plurality of tilt angles obtained as shown in FIGS. 13B and 13C, and the direction corresponding to the angle similar to the average angle is selected from the angle/direction correspondence view R. That is, for example, assuming that the obtained average angle is 63°, the corresponding direction is "direction 4".

Then, in each block B, the direction selected by the angle/direction correspondence view R shown in FIG. 13D is specified (refer to FIG. 13E).

Figure 12B:
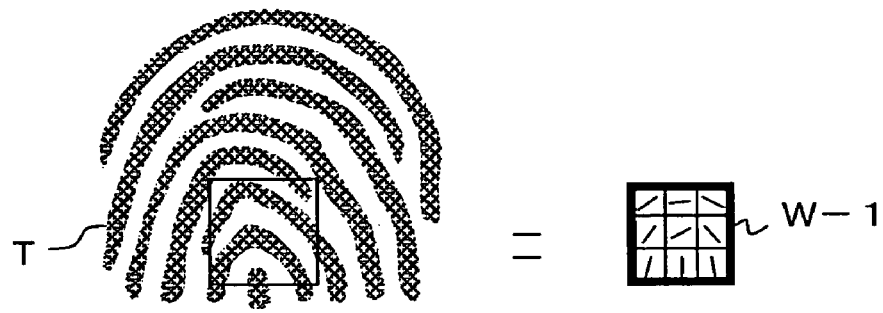
Figure 12C:
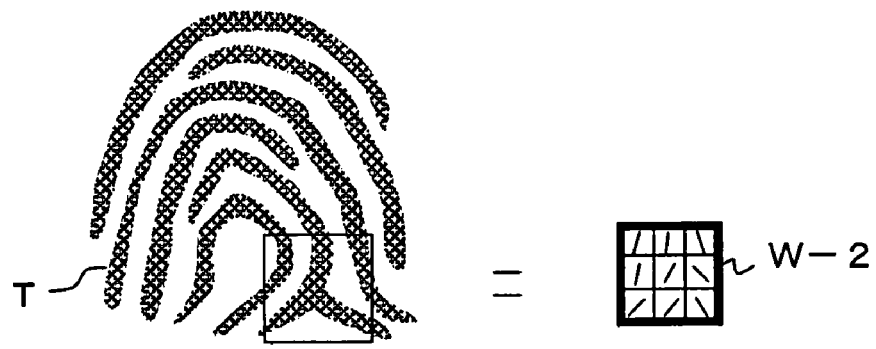

In step C2 shown in FIG. 11, the ridgeline direction detection unit 23 performs correlation arithmetic using the ridgeline direction partial distribution view W-1 or W-2 containing the center or delta recorded on the image recording unit 21, etc. and the ridgeline direction distribution view obtained in step C1 (refer to FIGS. 12B and 12C). The ridgeline direction partial distribution views W-1 and W-2 are configured by, for example, m×m blocks (n>m). The correlation value obtained at this time can be, for example, calculated as a sum of angle differences of the ridgelines of overlapping blocks, or as a sum of the differences of the values indicating the directions of the ridgelines of overlapping blocks.

In step C3, the ridgeline direction detection unit 23 defines a predetermined size of area as a partial image S using the centered position of the ridgeline direction partial distribution views W-1 or W-2 when the largest correlation value is obtained.

The position data of the partial image S is recorded on the image data recording unit 27.

"1. center and delta" can be set to obtain the variance in the ridgeline direction in a predetermined size of area (for example, an area of 3×3 blocks or more), and define the area as the partial image S when the largest variance is obtained.

Next, assume "2. feature point" to be included in the partial image S.

Figure 14:
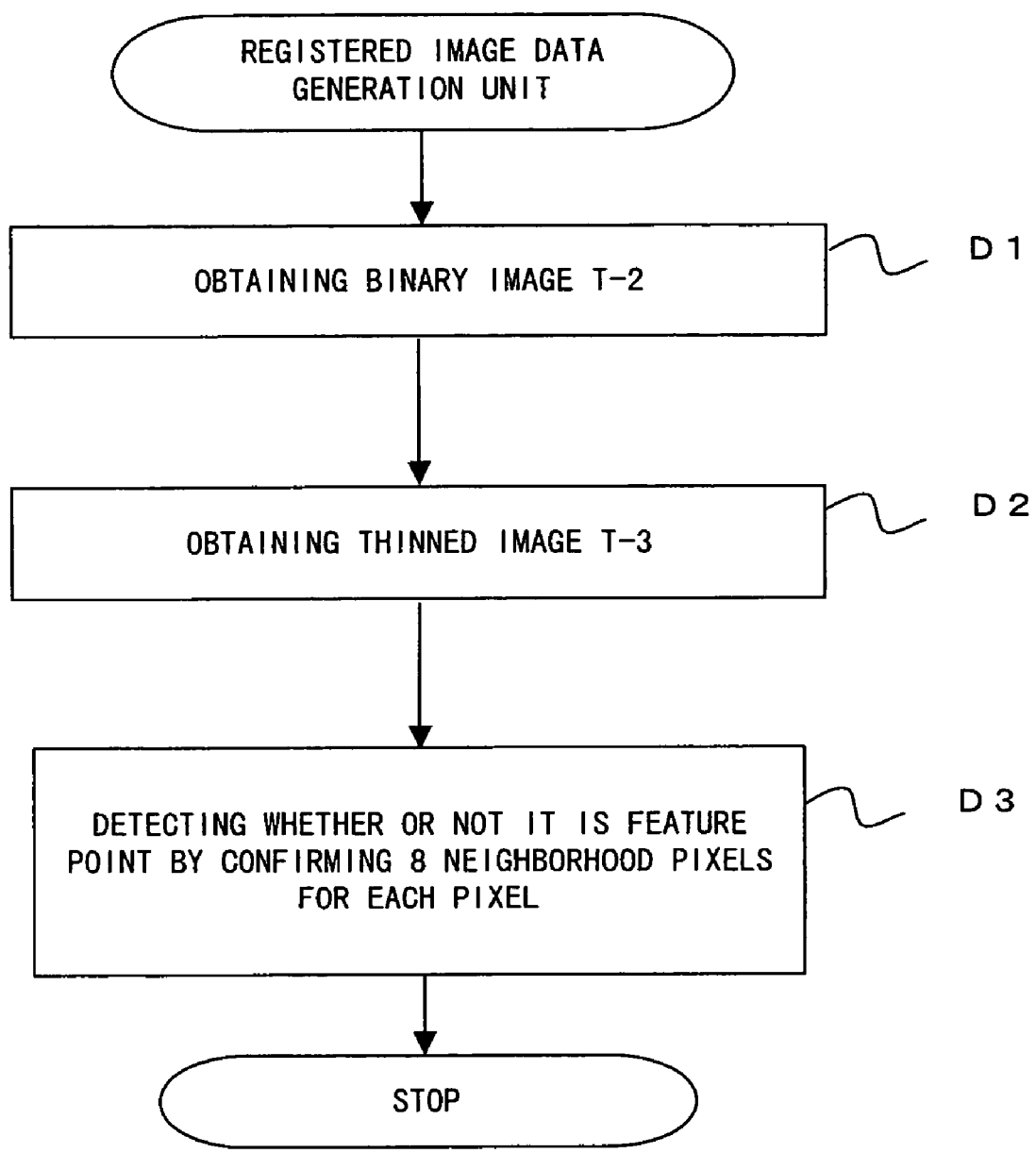
FIG. 14 is a flowchart for explanation of the operation of the registered image data generation unit according to the second embodiment of the present invention.

FIG. 14 is a flowchart for explanation of the operation of the image data generation unit 11 when "2. feature point" is included in the partial image S.

First, in step D1, the n value image generation unit 24 extracts predetermined image T from the image recording unit 21, and obtains the binary image T-2 of the image T.

Then, in step D2, the n value image generation unit 24 obtains the thinned image T-3 where the line width from the ridgeline direction distribution view T-2 to the ridgeline is 1 pixel from the binary image T-2 (refer to FIG. 15A).

In step D3, the n value image generation unit 24 looks up the pixels around a given pixel, detects a feature point, and defines an area of a predetermined size as a partial image S (refer to FIG. 15B).

Then, the position data of the partial image S is recorded on the image data recording unit 27.

For example, FIG. 15B shows the selection of an image of a size (for example, 3×3 pixels). When the pixel value of only one of the eight pixels around the central pixel of a chart is 1, the pixel can be recognized as a "endpoint". If a predetermined area having the selected centered pixel is the partial image S, the partial image S containing the "endpoint" can be registered. FIG. 15C shows "delta (branch point)", and the pixel values are arranged in the order of 1, 0, 1 in the eight pixels around a pixel having the pixel value of 1. The predetermined area containing the centered pixel is the partial image S, a partial image S containing "delta (branch point)" can be registered.

Third Embodiment

In the first embodiment, the relative position and relative angle of the image T and the image I are obtained using the partial image S, and using the obtained relative position and relative angle, the image T and the image I are superposed, thereby determining whether or not the image T matches the image I.

According to the third embodiment, to perform matching between two images with higher accuracy, the relative position and the relative angle between the image T and the image I are obtained using the entire image other than the partial image S, and it is determined whether or not the image T matches the image I. That is, when image matching is performed, a rough adjustment is made on the relative position and the relative angle between the image T and the image I using the partial image S, and then a fine adjustment is made based on the relative position and the relative angle obtained by the rough adjustment between the image T and the image I using the entire image.

Thus, since a rough adjustment can detect an approximate relative position and a relative angle, a fine adjustment only has to obtain the relative position and relative angle with the slight travel. Thus, the increment of the number of arithmetic operations generated in obtaining a correlation value, etc. according to the third embodiment can be very small.

Figure 16:
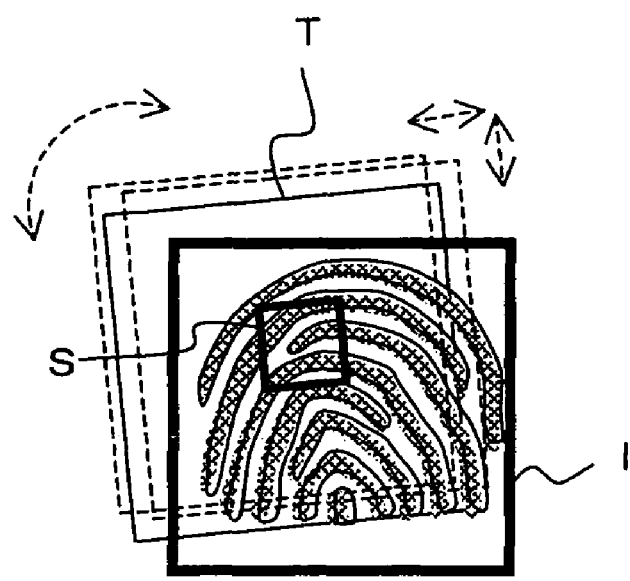
FIG. 16 shows an example of registered image data according to the third embodiment of the present invention.

For example, FIG. 16 shows the operation of a fine adjustment on the entire image. Based on the relative position and relative angle detected using the partial image S, the image T and the image I are superposed. Furthermore, the image T or the image I are perturbed in a predetermined translation direction (x direction, y direction) and in a predetermined rotation direction($\theta$), and a correlation value is obtained for each image. The largest correlation value is the final optimum correlation value. When the final correlation value satisfies a predetermined condition, the image T and the image I are determined to match. "Perturb" refers to a travel or a rotation in the x direction or the y direction in the range smaller than the travel range of the partial image S on the image I, or a rotation of an image made such that the central error of the image and the error surrounding the image can be smallest possible.

Figure 17:
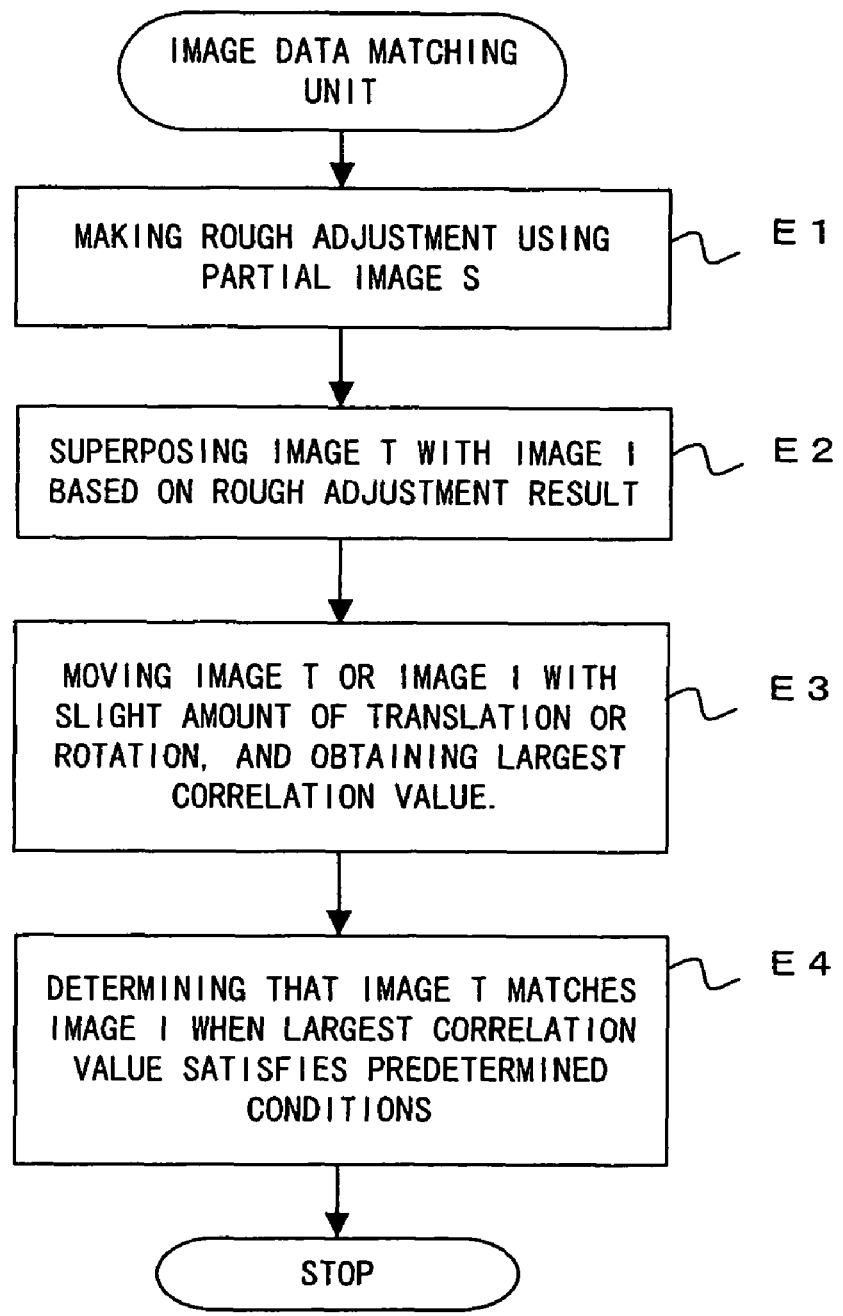
FIG. 17 is a flowchart for explanation of the operation of the image data matching unit according to the third embodiment of the present invention.

FIG. 17 is a flowchart for explanation of the operation of the image data matching unit 12 according to the third embodiment.

In step E1, the partial image segmentation unit 32 and the rough adjustment unit 37 aligns the partial image S when the image I and the partial image S indicates the largest overlap.

In step E2, the fine adjustment unit 38 superposes the image I and the image T based on the alignment result in step E1.

In step E3, the fine adjustment unit 38 perturbs the image T or image I in the translation direction and the rotation direction, obtains the correlation values between the image T and the image I for a predetermined amount of translation or rotation, and obtains the largest correlation value. The correlation value can be obtained by the above-mentioned equation (3), (4), etc.

In step E4, the determination unit 39 determines that the image T matches the image I when the largest correlation value obtained in step E3 satisfies a predetermined condition.

Fourth Embodiment

In the third embodiment of the present invention, a fine adjustment is made on the relative position and the relative angle between the image T and the image I using the entire image. However, when there is distortion in a part of the image, correlation arithmetic on the entire image cannot always output a correlation value indicating the sufficient overlap between two images. That is, although some portions of images overlap, other portions may not overlap due to the distortion.

In the fourth embodiment, when image matching is performed using the entire image to obtain a high correlation value, for example, an overlapping area between the image T and the image I is divided into a plurality of areas, a perturbing process is performed on each area independently, and a correlation value is obtained for each area.

Figure 18:
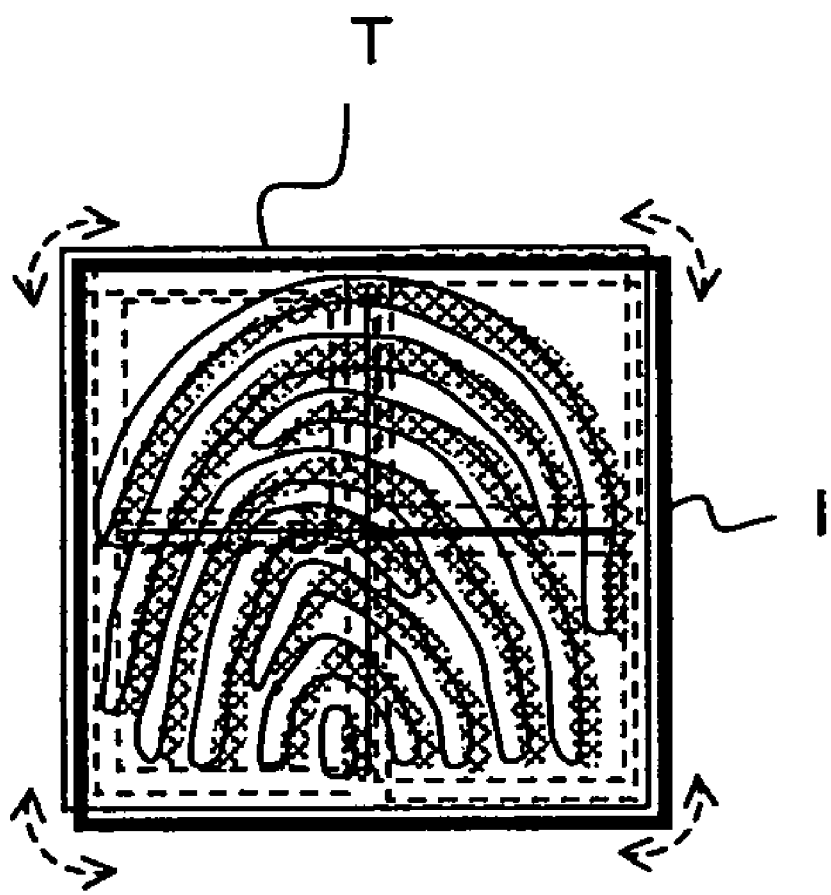
FIG. 18 shows an example of registered image data according to the fourth embodiment of the present invention.

For example, FIG. 18 shows an example of dividing an overlapping area between the image T and the image I into four portions.

First, the relative position and the relative angle between the image T and the image I are obtained using a partial image. Then, using the obtained relative position and the relative angle, two images are superposed. The overlapping area of the two images is divided into four portions, a predetermined amount of translation and rotation are changed in a predetermined translation direction and rotation direction independently in each area, and a correlation value is obtained in each area. The final correlation value between the image T and the image I can be a total by obtaining the largest evaluation value in each area, or can be an average value obtained by dividing the total by the number of areas.

Thus, image matching can be performed with high accuracy against the distortion generated in a part of an image. Especially, in matching fingerprint images, possible expansion or shrinkage of skin can be effectively processed by the fourth embodiment.

Described below is the operation of the image data matching unit 12 according to the fourth embodiment of the present invention.

Figure 19:
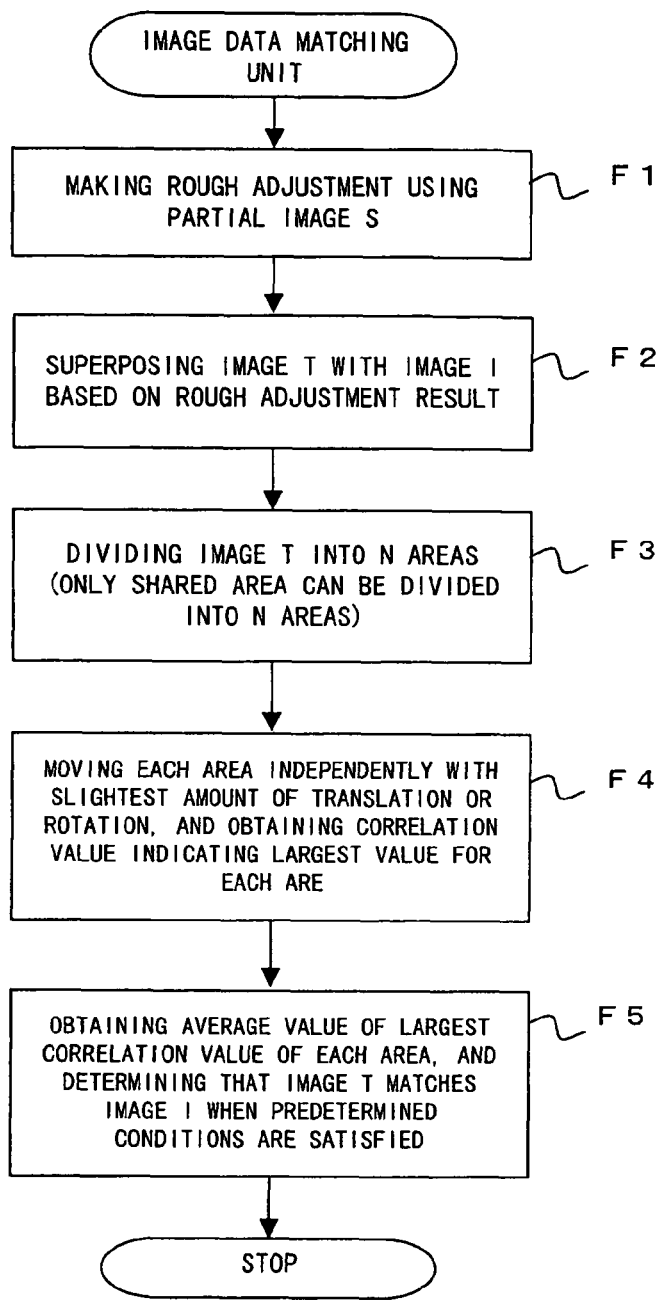
FIG. 19 is a flowchart for explanation of the operation of the image data matching unit according to the fourth embodiment of the present invention.

FIG. 19 is a flowchart showing the operation of the image data matching unit 12 according to the fourth embodiment.

In step F1, the partial image segmentation unit 32 and the rough adjustment unit 37 performs a rough adjustment for alignment between the image T and the image I using the partial image S.

Then, in step F2, the partial image segmentation unit 32 and the rough adjustment unit 37 superposes the image T and the image I based on the result of the rough adjustment in step F1.

In step F3, the image data dividing unit 33 divides the image T (or the image I) into n areas. As described above, only the overlapping area of the image T and the image I can be divided into n portions.

Then, in step F4, the fine adjustment unit 38 perturbs each of the divided areas independently and slightly in the translation direction and rotation direction by predetermined amounts of translation and rotation, obtains a correlation value for each of predetermined amount of translation and rotation in each area, and selects the largest correlation value in the obtained correlation values the correlation value of each area can be obtained by the above-mentioned equation (3) or (4), etc.

In step F5, the determination unit 39 obtains an average value of the largest correlation values in the respective areas, and when the average value satisfies a predetermined condition, determines that the two images match.

Fifth Embodiment

In the first embodiment, when a correlation value between a partial image S and an image I is obtained, the method of displacing the partial image S is not specifically indicated. Normally, the image matching is performed by superposing the end (for example, upper left) of the image I with the end (for example, lower right) of the partial image S, and sequentially moving the partial image S in a predetermined direction by each of the predetermined number of pixels.

In the fifth embodiment, by changing the scanning method, the number of arithmetic operations can be reduced when the relative position and the relative angle are obtained using the partial image S, and the time required to calculating the time for detecting the position data of the partial image S can be shortened more than in the first embodiment.

In the image T and the image I, the amount of translation and rotation are assumed to be originally small.

Figure 20A:
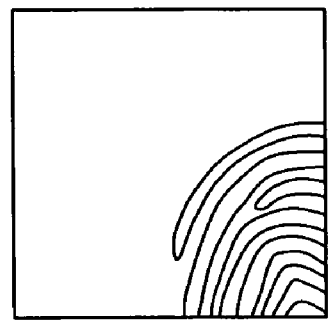
FIGS. 20A through 20C show an example of registered image data according to the fifth embodiment of the present invention.

For example, in matching fingerprint images, the images to be matched are fingerprint images. At this time, the fingerprint images in the image T and the image I are normally not displaced greatly. That is, it is not common that only a part of an image is input by the sensor 20 as shown in FIG. 20A. Therefore, when the correlation value between the partial image S and the image I is obtained, the position of the partial image S can be quickly detected when the correlation value is equal to or larger than a predetermined value during the scanning on the entire image if the partial image S is displaced and the correlation value is obtained in such a way that the amount of translation and the amount of rotation can sequentially increase initiating from the state 0 of the relative position and the relative angle (the state in which the image frames of mage T and the image I completely overlap).

Figure 20B:
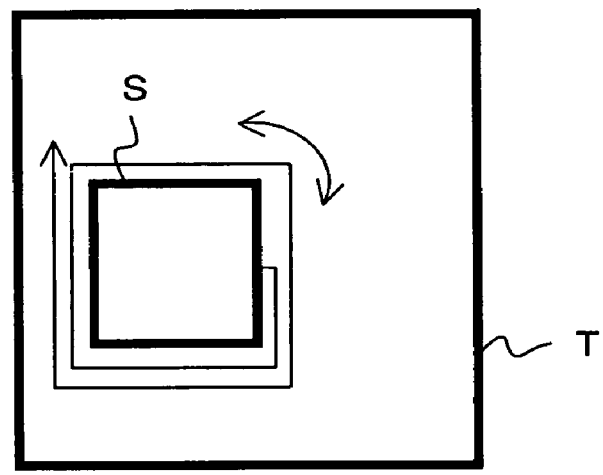
Figure 20C:
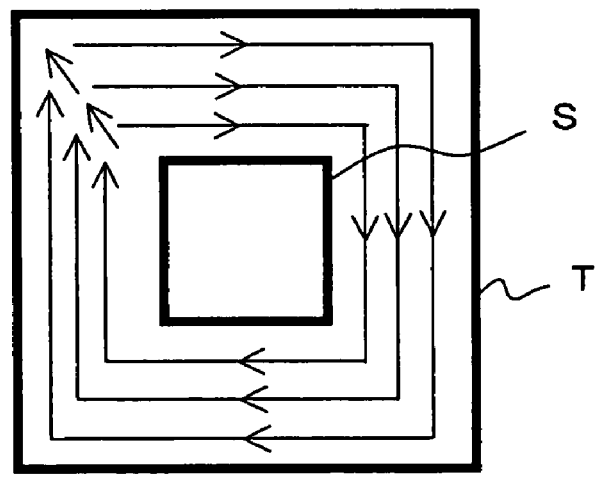

Thus, when the correlation value between the partial image S and the image I satisfies a predetermined condition, it is assumed that the relative position and the relative angle are obtained, and the subsequent arithmetic operations are stopped, thereby reducing the number of arithmetic operations. As a practical example of translation of the partial image S, as shown in FIG. 20B, it is considered that the relative position between the image T and the image I is displaced in a form of coil. Furthermore, as shown in FIG. 10C, the partial image S can be displaced as moving farther from the central position of the image I. Similarly, relating to the rotation of the partial image S, rotation between the image T and the image I starts from the state 0. That is, the method of sequentially rotating the partial image S from $-\theta°$ to $\theta°$ to obtain the correlation value at each angle is not used, but the relative angle is assumed to be defined as 0° firstly when the relative angle between the frame of the image T and that of the image I is zero (in which the frame of the image T and that of the image I completely overlap), and the partial image is rotated in the order of $\pm 1°$, ..., $+\theta°$, thereby obtaining the correlation value, and quickly obtaining the relative angle at which the largest correlation value is obtained.

The operation of the image data matching unit 12 according to the fifth embodiment is the same as the operation of the image data generation unit 11 according to the first embodiment except that the starting position of displacing the partial image S and the displacing method are different.

Sixth Embodiment

The sixth embodiment obtains the relative position and the relative angle between the image T and the image I using a plurality of partial images S1, S2, .... In the sixth embodiment, the accuracy of the image matching can be enhanced by obtain the relative position and the relative angle between the image T and the image I using two or more partial images S1, S2, ....

For example, FIG. 21 shows an example using two partial images S1 and S2.

Figure 21A:
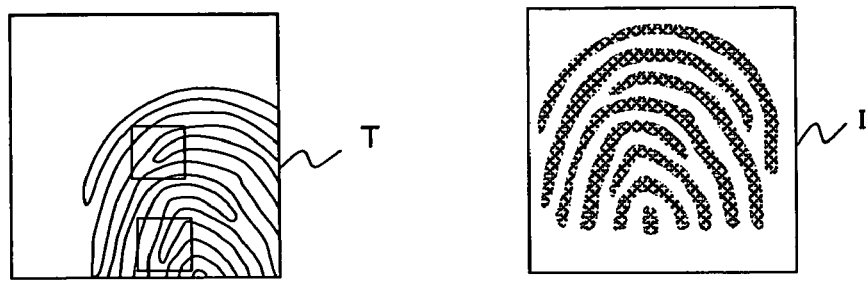
FIGS. 21A through 21C show an example a method of extracting a partial image according to the sixth embodiment of the present invention.
Figure 21B:
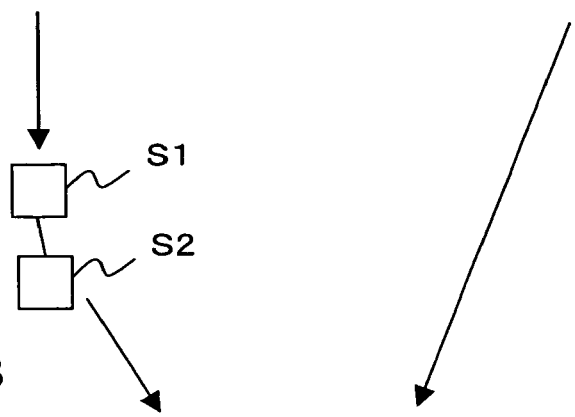

First, as shown in FIGS. 21A and 21B, two partial images S1 and S2 are segmented from the image T. At this time, the relative position between the two partial images S1 and S2 is maintained.

Figure 21C:
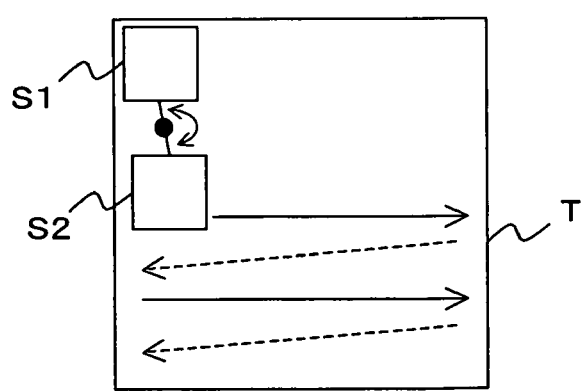

As shown in FIG. 21C, the partial images S and S2 are superposed with the relative position maintained on the image I, and the correlation value between the partial images S1 and S2 and the image I is obtained. The correlation value can be obtained by the above-mentioned equation (3) or (4), etc.

The sum of the correlation values is defined as the final correlation value. With the relative position between the partial images S1 and S2 maintained, the images are superposed on the image I while changing the relative position and the relative angle between the partial images S1 and S2, and the correlation values are sequentially obtained.

Then, the relative position and the relative angle indicating the highest correlation value refer to the position having the largest overlap between the image T and the image I.

Thus, using a plurality of partial images S, the effect of widely performing the partial image matching can be obtained. Therefore, as compared with using only one partial image S, the accuracy of image matching can be enhanced.

Described below is the operation of the image data generation unit 11 according to the sixth embodiment of the present invention.

Figure 22:
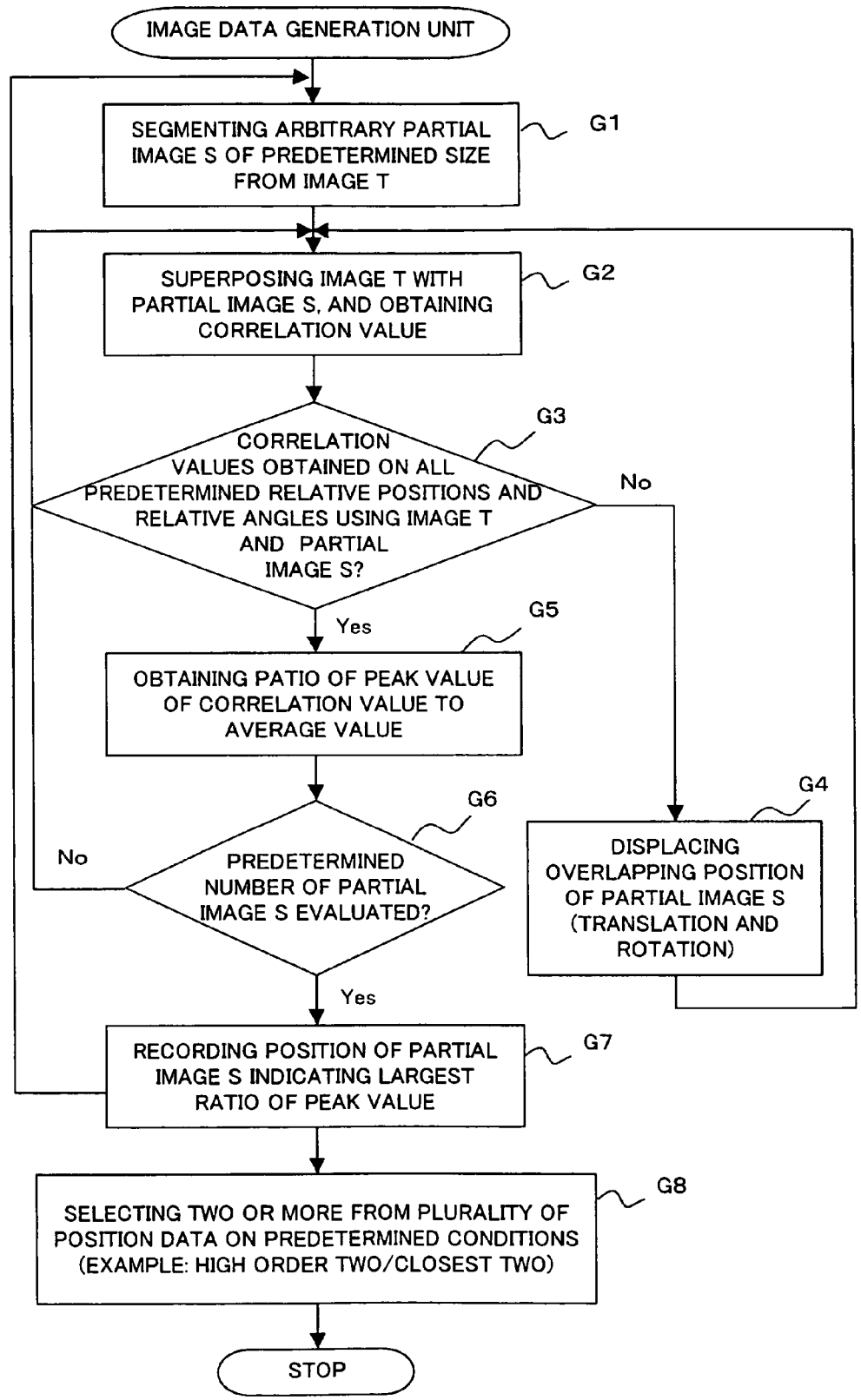
FIG. 22 is a flowchart for explanation of the operation of the registered image data generation unit according to the sixth embodiment of the present invention.

FIG. 22 is a flowchart of the operation of the image data generation unit 11 according to the sixth embodiment of the present invention.

First, in step G1, the characteristic structure position detection unit 22 extracts a predetermined image T from the image recording unit 21, and segments the partial image S of a predetermined size from the image T.

In step G2, the characteristic structure position detection unit 22 superposes the image T and the image S, and obtains a correlation value between them. The correlation value can be obtained by the above-mentioned (3) or (4), etc.

In step G3, the characteristic structure position detection unit 22 determines whether or not all correlation values have been obtained on all predetermined relative positions and relative angles when the image T and the partial image S overlap.

If all predetermined correlation values have not yet been obtained (No in step G3), the position of the partial image S is displaced in step G4, and control is returned to step G2.

If all correlation values have been obtained (Yes in step G3), the characteristic structure position detection unit 22 obtains the ratio of the peak value of the obtained correlation values to the average value of the obtained correlation values in step G5.

In step G6, the characteristic structure position detection unit 22 determines whether or not the ratio of the peak value of the correlation values to the average value has been obtained for a predetermined number of partial images S (S1, S2, ...).

If the ratio of the peak value to the average value has not been obtained for a predetermined number of partial images S (S1, S2, ...) (No in step G6), control is returned to step A2, and an unprocessed partial image S is evaluated.

Meanwhile, if all partial images S (S1, S2, ...) have been evaluated (Yes in step G6), then the characteristic structure position detection unit 22 records on the image data recording unit 27 the position data (coordinates, etc.) of the partial image S having the highest ratio of the peak value of the obtained correlation values to the average value in step G7.

In step G8, the characteristic structure position detection unit 22 selects two or more pieces of position data from the position data of a plurality of partial image S recorded on the image data recording unit 27 under a predetermined condition. The predetermined condition refers to selecting two high order correlation values from among a plurality of obtained correlation values, or selecting two pieces of closest position data. Then, relative position data is obtained from the position data of the partial image S1 and the position data of the partial image S2, and the relative position data is recorded on the image data recording unit 27, etc.

Described below is the operation of the image data matching unit 12 according to the sixth embodiment.

Figure 23:
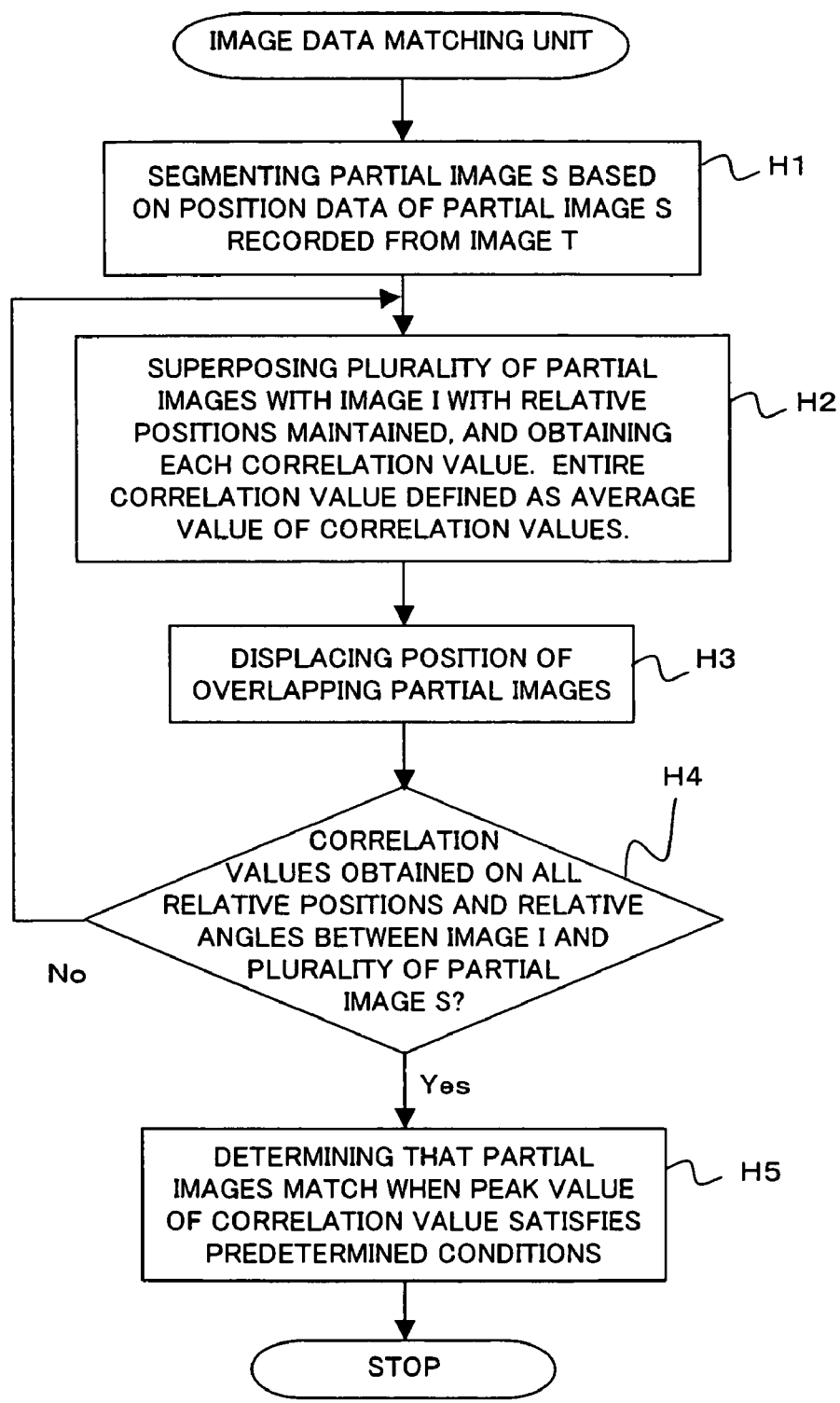
FIG. 23 is a flowchart for explanation of the operation of the image data matching unit according to the sixth embodiment of the present invention.

FIG. 23 is a flowchart of the operation of the image data matching unit 12 according to the sixth embodiment of the present invention.

First in step H1, the partial image segmentation unit 32 extracts the position data of the plurality of partial images S (S1, S2, . . . ) selected in step G8 shown in FIG. 21 from the registered image data recording unit 30, and segments the plurality of partial images S (S1, S2, . . . ) from the image T based on the position data.

Then, in step H2, the rough adjustment unit 37 extracts the image I from the input image data recording unit 31, superposes the plurality of partial images S (S1, S2, . . . ) on the image I with the relative positions maintained, and obtains correlation values. For example, the total correlation value for all the plurality of partial images S (S1, S2, . . . ) can be an average value or a sum of the correlation values of the plurality of partial images S (S1, S2, . . . ). The correlation value can be obtained using the above-mentioned equation (3) or (4), etc.

In step H3, the rough adjustment unit 37 moves the plurality of partial images S (S1, S2, . . . ) with the relative positions maintained by a predetermined amount of translation and rotation in step H3 in a predetermined translation direction and rotation direction.

Then, in step H4, the rough adjustment unit 37 determines whether or not correlation values have been obtained for all predetermined relative positions and relative angles between the image I and the plurality of partial images S (S1, S2, . . . ).

When correlation values have not been obtained for all predetermined relative positions and relative angles (NO in step H4), control is returned to step H2, and necessary correlation values are obtained.

If correlation values are obtained for all predetermined relative position and relative angle (YES in step H4), the determination unit 39 determines in step H5 that the image I matches the partial image S when the largest correlation value satisfies a predetermined condition in the correlation values obtained in the steps from H2 to H4. The correlation value can be obtained by the above-mentioned equation (3) or (4).

Seventh Embodiment

In the first through sixth embodiments, the relative position and the relative angle between the image T and the image I are obtained using the partial image S. However, in the seventh embodiment, in the stage before obtaining the relative position and the relative angle, the relative position and the relative angle between the image T and the image I are obtained using the characteristic information extracted from the image T and the image I. For example, the seventh embodiment obtains the relative position and the relative angle between the image T and the image I using the ridgeline direction distribution view obtained from the image T and the ridgeline direction distribution view obtained from the image I.

For example, FIG. 24A shows the ridgeline direction distribution view T-4 generated from the image T, and FIG. 24B shows the ridgeline direction distribution view I-1 generated from the image I. In the ridgeline direction distribution views T-4 and I-1 shown in FIGS. 24A and 24B, the fingerprint image input from the sensor 20 is divided into blocks of a predetermined size, and a result of detecting the ridgeline direction in each block is shown. The generating method is the same as the method of generating the ridgeline direction distribution view shown in FIG. 13.

By comparing the ridgeline direction distribution view T-4 with the ridge line direction distribution view I-1, the relative position and the relative angle between the image T and the image I can be obtained.

The method of obtaining the correlation value using the ridgeline direction distribution views T-4 and I-1 is similar to the method of obtaining the correlation value between the image T and the partial image S, and the ridgeline direction distribution views T-4 and I-1 are superposed while moving the ridgeline direction distribution view T-4 in a predetermined translation direction by a predetermined amount of translation, and a correlation value is obtained for each predetermined amount of translation (refer to FIG. 24C). The correlation value at this time can be, for example, a sum of squares of angle differences of ridgelines in overlapping blocks, a ratio of the number of blocks smaller than a predetermined angle difference of a ridgeline, etc.

Furthermore, when a correlation value is obtained with one ridgeline direction distribution view rotated little by little, a relative angle can also be obtained. FIG. 24D shows, for example, a result of rotating the ridgeline direction distribution view T-4 at a predetermined rotation angle. Then, for example, correlation arithmetic is performed using the ridgeline direction distribution view T-4 shown in FIG. 24D and the ridgeline direction distribution view I-1 shown in FIG. 24B.

That is, using the ridgeline direction distribution views T-4 and I-1, the approximate relative position and relative angle between the image T and the image I are obtained (first rough adjustment), and then precise relative position and relative angle between the image T and the image I are obtained using the partial image S (second rough adjustment). Then, as in the third embodiment, when the accuracy of the image matching is to be enhanced, the relative position and the relative angle between the image T and the image I are obtained using the entire image (fine adjustment). Thus, since the relative position and the relative angle between the image T and the image I are obtained in three stages, image matching can be performed with high accuracy than in the first and third embodiments of the present invention.

As described above, since the relative position and the relative angle can be detected by the first and second rough adjustments, the relative position and the relative angle can be obtained with a small amount of travel by the fine adjustment. Thus, the increase in number of arithmetic operations in obtaining a correlation value in the seventh embodiment can be reduced.

Described below is the operation of the image data matching unit 12 in the seventh embodiment.

Figure 25:
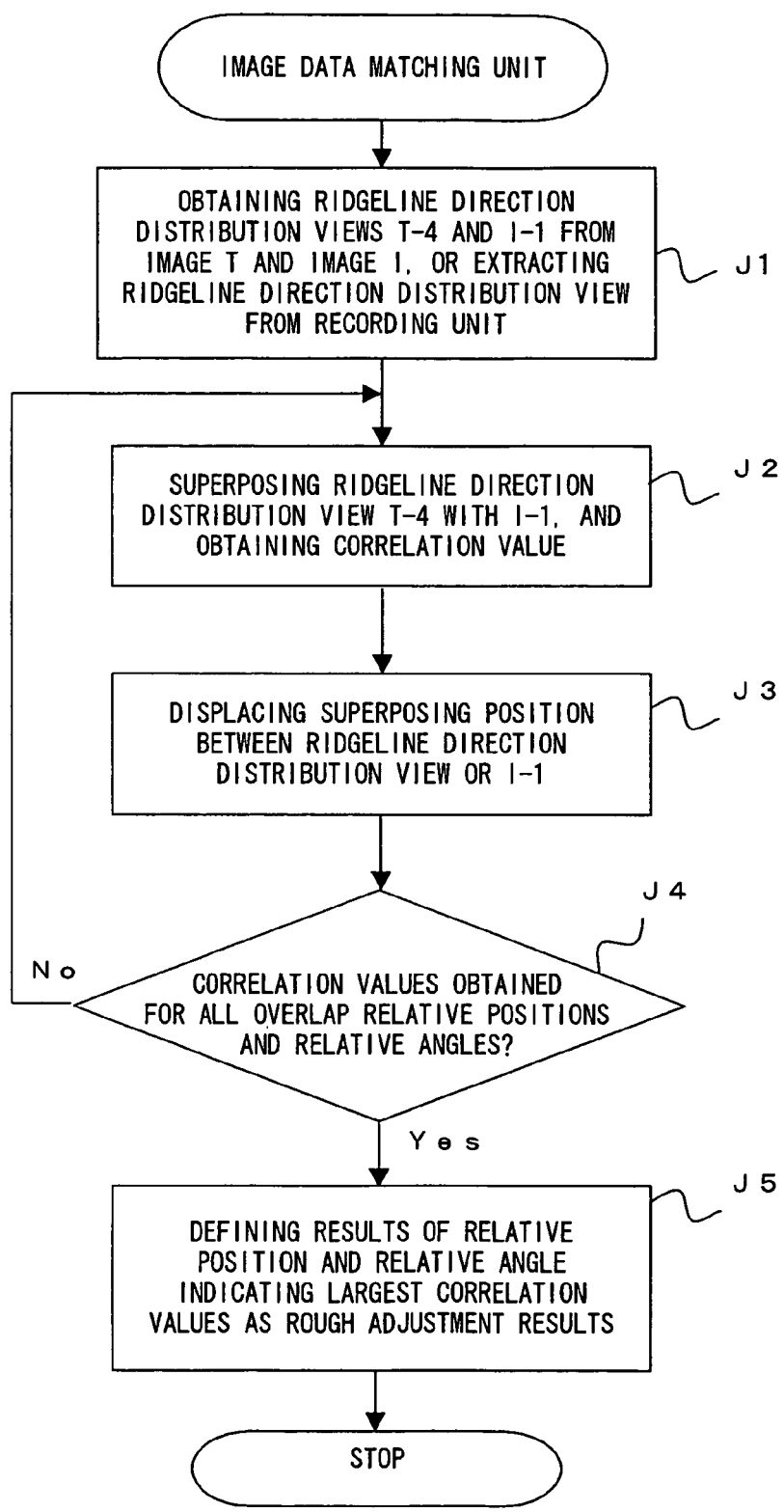
FIG. 25 is a flowchart for explanation of the operation of the image data matching unit according to the seventh embodiment of the present invention.

FIG. 25 is a flowchart of the operation of the image data matching unit 12 in the seventh embodiment.

First in step J1, the ridgeline direction distribution data separating unit 34 extracts a predetermined image T from the registered image data recording unit 30, and the ridgeline direction distribution view T-4 is generated from the image T or the ridgeline direction distribution view T-4 recorded on the registered image data recording unit 30 is extracted, and a predetermined image I is extracted from the input image data recording unit 31 to generate the ridgeline direction distribution view I-1 from the image I. The valley line direction distribution view can also be generated.

In step J2, the rough adjustment unit 36 superposes the ridgeline direction distribution views T-4 and I-1 to obtain a correlation value.

Then, in step J3, the rough adjustment unit 36 displaces the position of the ridgeline direction distribution view T-4 or I-1.

In step J4, the rough adjustment unit 36 determines whether or not correlation values have been obtained for all predetermined relative positions and the relative angles between the ridgeline direction distribution view T-4 and the ridgeline direction distribution view I-1.

If all predetermined correlation value have not been obtained (No in step J4), control is returned to step J2, and necessary correlation values are obtained.

Meanwhile, when all predetermined correlation values have been obtained (Yes in step J4), then the rough adjustment unit 36 transmits to the rough adjustment unit 37 in step J5 a calculation result of the relative position and the relative angle for the ridgeline direction distribution views T-4 and I-1 when the largest correlation value satisfies a predetermined condition in the correlation values obtained in the steps from J2 to J4.

Eighth Embodiment

The seventh embodiment uses the ridgeline direction distribution view in detecting the relative position and the relative angle between the image T and the image I while the eighth embodiment extracts a feature point from each of the image T and the image I, and obtains the relative position and the relative angle between the image T and the image I based on the feature points.

As shown in FIG. 26A, the feature point distribution views T-5 and I-2 indicating the distributions of the feature points P1 and P2 of the image T and the image I respectively.

As shown in FIG. 26B, the feature point distribution views T-5 and I-2 are superposed and detecting the relative positions of the feature point distribution views T-5 and I-2 when predetermined feature points P1 and P2 indicate the largest overlap are obtained. The overlap of the predetermined feature points P1 and P2 can be determined based on whether or not a sum of the distances of a pair of feature points P1 and P2, which are the closest to each other when the two distribution views are superposed, is larger than a predetermined value. Furthermore, when the overlap of the feature points P1 and P2 is evaluated with the feature point distribution view T-5 or I-2 rotated little by little, the relative angle can also be obtained.

The position data of the feature points P1 and P2 can be simultaneously recorded in the ridgeline direction distribution views T-4 and I-1 by combining the seventh and eighth embodiments. That is, for example, as shown in FIG. 26C, the feature point is expressed by bold frames in the ridgeline direction distribution view T-4, and its ridgeline direction distribution view T-4 can be recorded. When the position data of the feature point in the ridgeline direction distribution view is simultaneously recorded and a correlation value is obtained, the correlation value is increased when the angle difference in the ridgeline direction of the block containing the feature point is smaller than a predetermined value in the overlapping ridgeline direction distribution view T-4, thereby obtaining the relative position and the relative angle with high accuracy.

Thus, in the eighth embodiment, using the relative positions of the feature points P1 and P2 in the feature point distribution views T-5 and I-2, the relative position and the relative angle between the image T and the image I are obtained.

Described below is the operation of the image data matching unit 12 according to the eighth embodiment.

Figure 27:
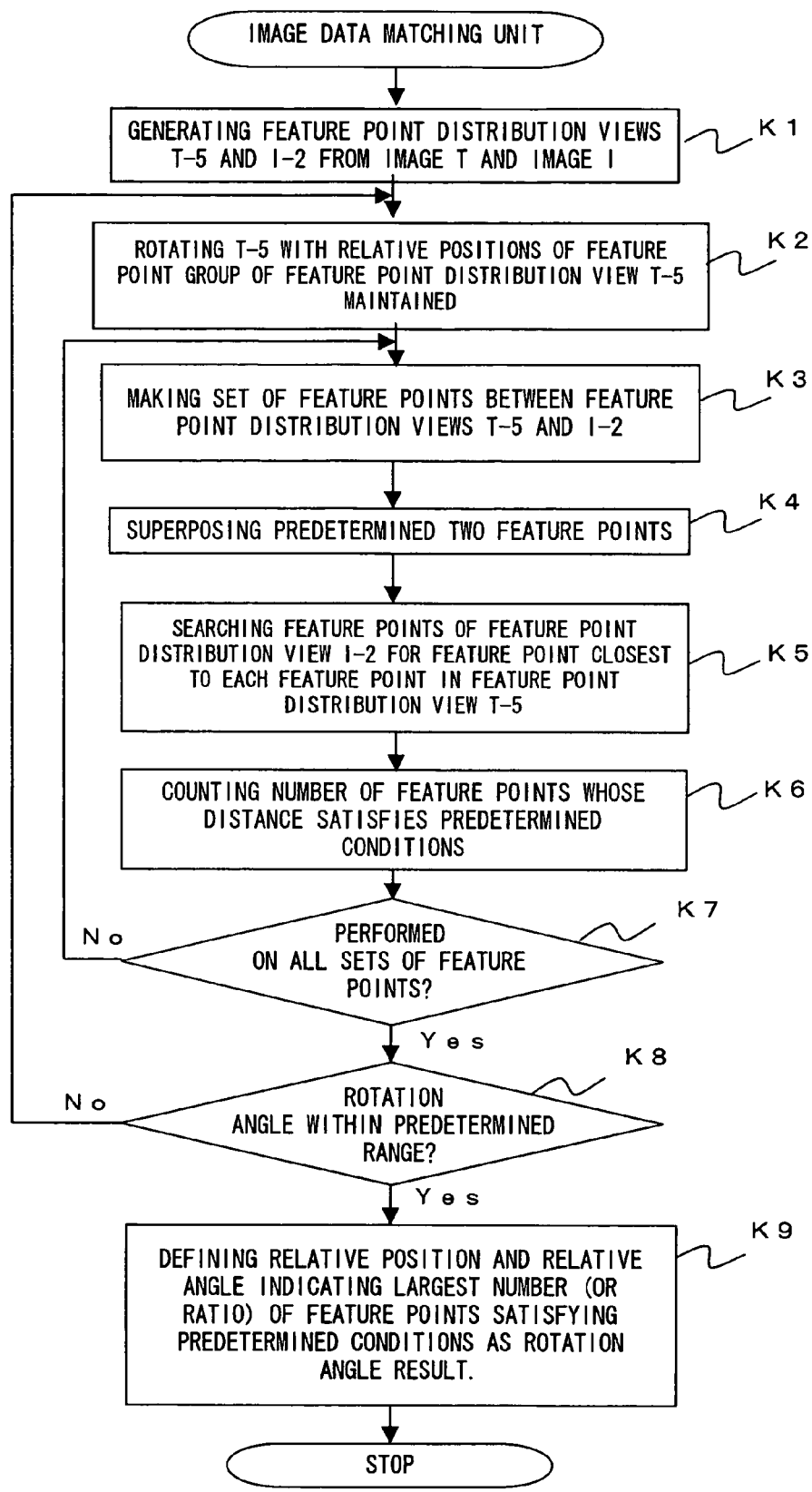
FIG. 27 is a flowchart for explanation of the operation of the image data matching unit according to the eighth embodiment of the present invention.

FIG. 27 is a flowchart of the operation of the image data matching unit 12 according to the eighth embodiment. FIG. 28 shows an example of the data used in each step of the flowchart shown in FIG. 27.

First in step K1, the 36 extracts a predetermined image T from the registered image data recording unit 30 and generates the feature point distribution view T-5 from the image T, a predetermined image I from the input image data recording unit 31, and generates the ridgeline direction distribution view I-2 from the image I. In the example shown in FIG. 28A, the feature points 1 through 4 are shown in the feature point distribution view T-5, and the feature points A through D are shown in the ridgeline direction distribution view I-2.

Then, in step K2, the rough adjustment unit 36 rotates the feature point distribution view T-5 at a predetermined angle with the relative position of each feature point in the feature point distribution view T-5 maintained (refer to FIG. 28).

In step K3, the rough adjustment unit 36 generate a set of feature points between the feature point distribution views T-5 and I-2.

Then, in step K4, the rough adjustment unit 36 superposes a predetermined feature point in the feature point distribution view T-5 with a predetermined feature point in the ridgeline direction distribution view I-2. In the example shown in FIG. 28C, the feature point 1 is superposed on the feature point A.

Then, in step K5, the rough adjustment unit 36 searches the ridgeline direction distribution view I-2 for the feature point closest to each feature point in the feature point distribution view T-5.

In the example shown in FIG. 28D, the feature point 2—the feature point B, the feature point 3—the feature point C, and the feature point 4—the feature point D are the set of feature points each having the shortest distance.

In step K6, the rough adjustment unit 36 counts the distances d (d1, d2, d3, ...) satisfying a predetermined condition between each feature point detected in step K5 and each feature point in the corresponding feature point distribution view T-5.

Then, in step K7, the rough adjustment unit 36 determines on all combinations of feature points as to whether or not the processes from step K4 to step K6 have been performed.

When there is a combination of feature points not processed from step K4 to step K6 (No in step K7), control is returned to step K3.

Meanwhile, if the processes from step K4 to step K6 are performed at the feature points in all combinations (Yes in step K7), the rough adjustment unit 36 determines in step K8 whether or not the feature point distribution view T-5 has been rotated at a predetermined range of rotation angle. For example, in the example shown in FIG. 28, a combination of (1, A), (1, B), (1, C), (1, D), (2, A), (2, B), ..., (4, C), (4, D) is obtained.

If the feature point distribution view T-5 has not been rotated at a predetermined range of rotation angle (No in step K8), control is returned to step K2.

If the ridgeline direction distribution view T is rotated at a predetermined range of rotation angle (YES in step K8), the rough adjustment unit 36 transmits to the rough adjustment unit 37 in step K9 a calculation result of the relative position and the relative angle between the feature point distribution view T-5 and the ridgeline direction distribution view I-2 when the largest number of feature points or ratio satisfying a predetermined condition can be obtained.

Ninth Embodiment

In the first through eighth embodiments, it is determined that the image T matches the image I when the finally obtained correlation value using the entire image satisfies a predetermined condition. However, in matching fingerprint images, higher accuracy is requested. In this case, when a correlation value is obtained using the entire image, for example, if only an area in the vicinity of a feature point is highly weighted, the accuracy of matching fingerprint images can be enhanced.

For example, when a correlation value (evaluation value) is v (x, y), an image T is f (i, j), and an image I is g (i−x, j−y), the following equation (5) holds $$v(x,y)=(1/Z)\Sigma f(i,j)g(i-x,j-y)A(i,j)B(i-x,j-y) \quad (5)$$

where A (i, j)=α1 (when f (i, j) refers to the vicinity of a feature point), and A (i, j)=β1 (when f (i, j) does not refer to the vicinity of a feature point). α1>β1;

where B (i, j)=α2 (when g (i, j) refers to the vicinity of a feature point), and B (i, j)=β2 (when g (i, j) does not refer to the vicinity of a feature point). α2>β2; and where Z indicates the area of the region in which f (i, j) overlaps g (i−x, j−y).

Additionally, when a correlation value (evaluation value) is v (x, y), an image T is f (i, j), and an image I is g (i−x, j−y), the following equation (6) holds $$v(x,y)=(1/Z)\Sigma f(i,j)g(i-x,j-y)A(i,j) \quad (6)$$

where A (i, j)=α1 (when f (i, j) refers to the vicinity of a feature point), and A (i, j)=β1 (when f (i, j) does not refer to the vicinity of a feature point). α1>β1; and where Z indicates the area of the region in which f (i, j) overlaps g (i−x, j−y). The vicinity of a feature point can be defined as a predetermined size with a centered feature point position as shown in FIG. 28.

When a correlation value (evaluation value) is v (x, y), an image T is f (i, j), an image I is g (i−x, j−y), and the value range of f (i, j) and g (i, j) is 0 or 1, the following equation (7) holds $$v(x,y)=(1/Z)\Sigma \mathrm{not}(f(i,j)\mathrm{xor}g(i-x,j-y))A(i,j)B(i-j,j-y) \quad (7)$$

where A (i, j)=α1 (when f (i, j) refers to the vicinity of a feature point), and A (i, j)=β1 (when f (i, j) does not refer to the vicinity of a feature point). α1>β1;

where B (i, j)=α2 (when g (i, j) refers to the vicinity of a feature point), and B (i, j)=β2 (when g (i, j) does not refer to the vicinity of a feature point). α2>β2;

or xor indicates an exclusive logical sum, and not indicates negation; or where Z indicates the area of the region in which f (i, j) overlaps g (i−x, j−y).

For example, when a correlation value (evaluation value) is v (x, y), an image T is f (i, j), an image I is g (i−x, j−y), and the value range of f (i, g) and g (i, j) is 0 or 1, the following equation (8) holds $$v(x,y)=(1/Z)\Sigma \mathrm{not}(f(i,j)\mathrm{xor}g(i-x,j-y))A(i,j) \quad (8)$$

where A (i, j)=α1 (when f (i, j) refers to the vicinity of a feature point), and A (i, j)=β1 (when f (i, j) does not refer to the vicinity of a feature point). α1>β1;

or xor indicates an exclusive logical sum, and not indicates negation; or where Z indicates the area of the region in which f (i, j) overlaps g (i−x, j−y).

Tenth Embodiment

According to the tenth embodiment of the present invention, after performing a rough adjustment or a fine adjustment in the first through eighth embodiments, image matching is performed using an entire image, and image matching is performed using a feature point.

First, the image matching is performed according to the first through eighth embodiments, and the relative position and the relative angle are obtained between the image T and the image I.

Figure 29:
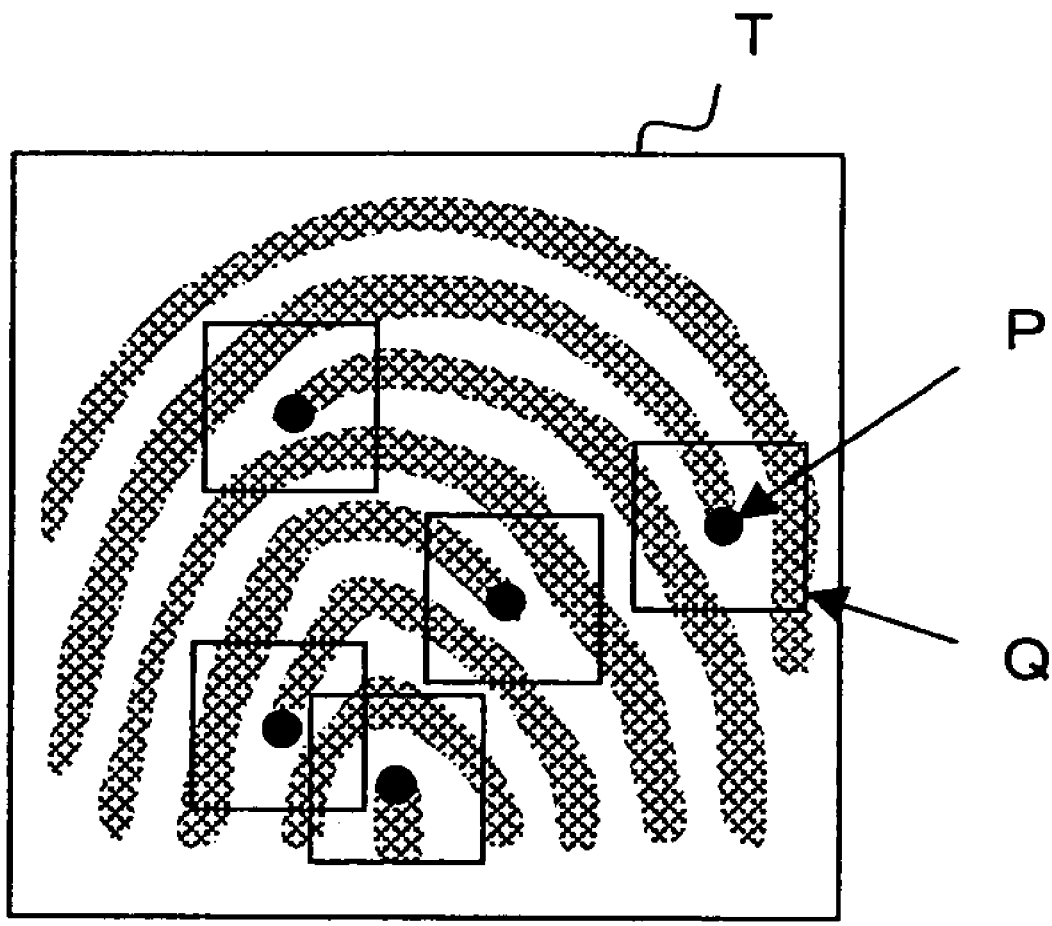
FIG. 29 shows an example of registered image data according to the tenth embodiment of the present invention.

Then, using the relative position and the relative angle, the image T and the image I are superposed, a correlation value is obtained between entire images, and a correlation value is obtained between predetermined areas near a feature point. A predetermined area near a feature point when the correlation value is obtained is, for example, an area of a predetermined size having a centered feature point. In the example shown in FIG. 29, the predetermined area Q near the feature point P is expressed by a square, but the shape of a predetermined area is not limited to a specific shape.

When the correlation value of the predetermined area Q near the feature point P is obtained, the predetermined area Q near one feature point P is perturbed by the amount of translation and the amount of rotation in the translation direction and rotation direction, and a correlation value is obtained for each of the predetermined amount of translation and rotation. The largest correlation value is defined as a correlation value of the predetermined area Q near the feature point P.

When a correlation value is obtained, and a predetermined condition is satisfied in the predetermined area Q near the feature point P, it is determined that the feature points P match, and when the number or the ratio (number of matching feature points P/number of entire registered feature points P) of the matching feature points P exceeds a predetermined value and the correlation value of the entire image satisfies a predetermined condition, it is determined that the image T and the image I match.

Described below is the operation of the image data matching unit 12 according to the tenth embodiment of the present invention.

Figure 30:
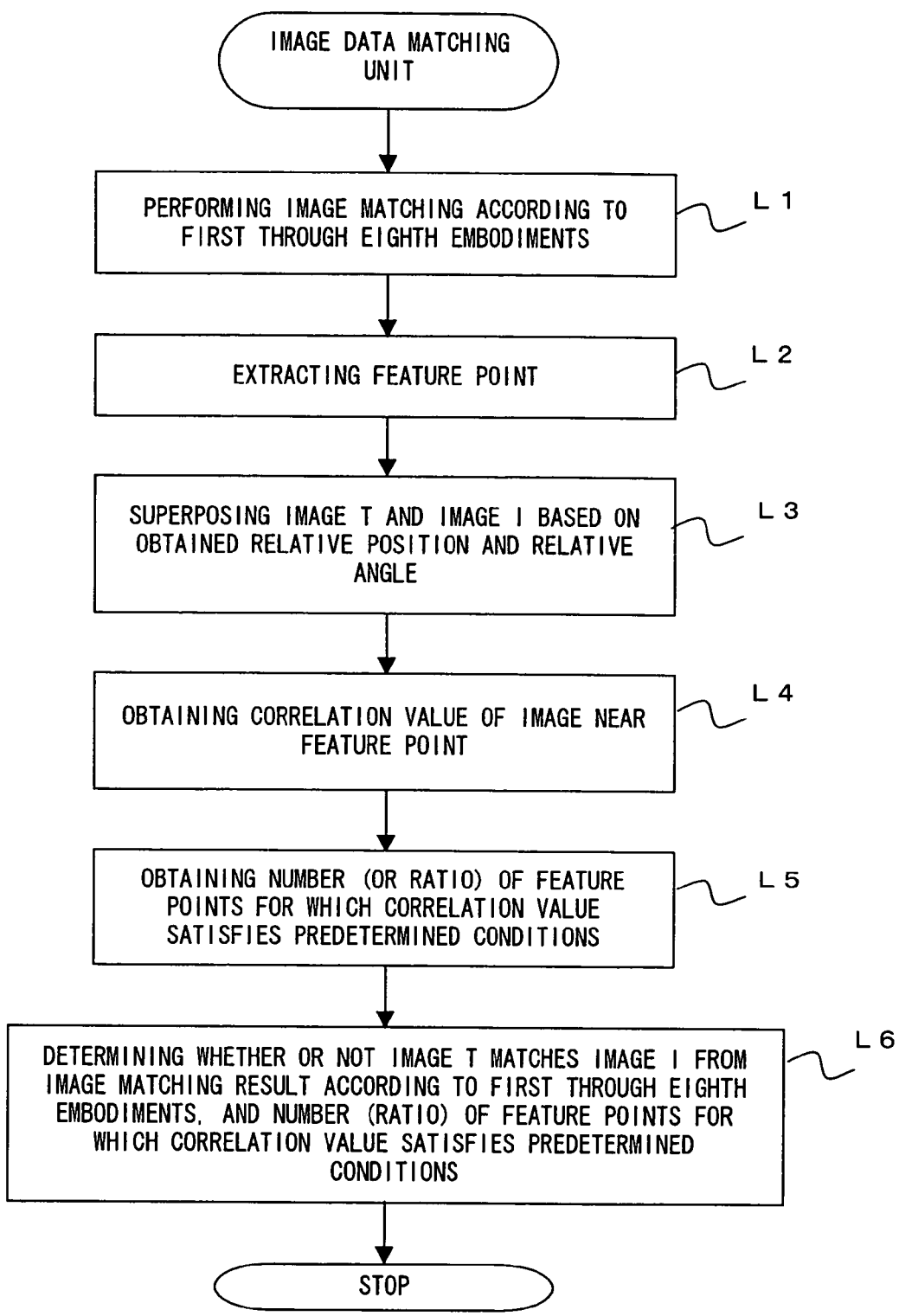
FIG. 30 is a flowchart for explanation of the operation of the image data matching unit according to the tenth embodiment of the present invention.

FIG. 30 is a flowchart showing the operation of the image data matching unit 12 in the tenth embodiment of the present invention.

First, in step L1, the rough adjustment unit 36 or 37 performs image matching using the matching method according to the first through eighth embodiments.

Then, in step L2, the feature point local area matching unit 35 retrieves a predetermined image T from the registered image data recording unit 30, also retrieves the feature point of the image T and retrieves a predetermined image I from the input image data recording unit 31, and extracts the feature point of the image I. It is also possible to extract a feature point when image data is generated, and to couple it to image data.

Then, in step L3, the feature point local area matching unit 35 superposes the image T and the image I based on the relative position and the relative angle between the image T and the image I already obtained in step L1.

Then, in step L4, the feature point local area matching unit 35 obtains the correlation value between the predetermined area Q near the feature point P of the image T and the predetermined area Q near the feature point P of the image I. The correlation value can be obtained by the above-mentioned equation (3) or (4), etc.

Next, in step L5, the feature point local area matching unit 35 obtains the number of the correlation values which are obtained in step L4 and satisfy a predetermined condition. It is also possible to obtain the number of correlation values in the entire feature points which are obtained in step L4 and satisfy a predetermined condition.

In step L6, the determination unit 39 determines based on the image matching result in step L1 and the number of the values obtained in step L5 whether or not the image T and the image I match. That is, for example, when the result of image matching check in step L1 indicates matching, and the number of the values obtained in step L5 satisfies a predetermined condition, it is determined that the image T and the image I match.

Eleventh Embodiment

In the tenth embodiment, it is determined whether or not the image T and the image I match based on the results of the image matching according to the first through eighth embodiments together with the result of the image matching using a feature point. However, in the eleventh embodiment, the relative position and the relative angle between the image T and the image I are first obtained according to the first through eighth embodiments, the predetermined area Q near the feature point P of the image T and the predetermined area Q near the feature point P of the image I are superposed using the obtained relative position and the relative angle, and determines whether or not the image T and the image I match based on the correlation value between the predetermined areas Q near the feature points P.

That is, using the relative position and the relative angle obtained according to the first through eighth embodiments, the predetermined areas Q near the feature points P are superposed, and it is determined whether or not the image T and the image I match based on the correlation value between the images.

The explanation of the operation of the image data matching unit 12 according to the eleventh embodiment is omitted here because it is obtained only by changing step L6 in the flowchart shown in FIG. 30 to "DETERMINING WHETHER OR NOT IMAGE T AND IMAGE I MATCHES BASED ON NUMBER OF FEATURE POINTS FOR WHICH CORRELATION VALUE SATISFIES PREDETERMINED CONDITION".

Described below concretely is the number of arithmetic operations in the image matching method according to the present embodiment and the number of arithmetic operations in the conventional image matching method.

First, the number of arithmetic operations in the conventional image matching method is concretely described below.

For example, assume that the image T is an image of the size of 128 pixels×128 pixels, and the image I is an image of the size of 128 pixels×128 pixels, and the image T is displaced pixel by pixel to obtain the relative position between the image T and the image I.

In this case, the number N1 of arithmetic operations (multiplication) is expressed by $N1=128\times2\times128\times2\times128\times128\approx1,000,007,000$.

Described concretely below is the number of arithmetic operations in the image matching method according to the first embodiment of the present invention.

For example, assume that the image T is an image of the size of 128 pixels×128 pixels, the partial image S is an image of the size of 32 pixels×32 pixels, and the image I is an image of the size of 128 pixels×128 pixels, and the image S is displaced pixel by pixel to obtain the relative position between the image T and the image I.

In this case, the number N2 of arithmetic operations is expressed by $N2=128\times2\times128\times2\times32\times32\approx67,000,000$.

Described concretely below is the number of arithmetic operations in the image matching method according to the third embodiment of the present invention.

For example, assume that the image T is an image of the size of 128 pixels×128 pixels, the partial image S is an image of the size of 32 pixels×32 pixels, the image I is an image of the size of 128 pixels×128 pixels, and the ridgeline direction distribution views T and I are images of the size of 16 blocks× 16 blocks, and the partial image S and the ridgeline direction distribution view T are displaced pixel by pixel and block by block to obtain the relative position between the image T and the image I. Assume that 1 block=8 pixels×8 pixels.

In this case, the number N3 of arithmetic operations is a sum (670,000) of the number N3(1) of arithmetic operations=$16\times2\times16\times2\times16\times16\approx260,000$ for use in obtaining the relative position between the image T and the image I by the ridgeline direction distribution views T and I and the number N3(2) of arithmetic operations=$32\times32\times20\times20\approx410,000$ for use in obtaining the relative position between the image T and the image I by the partial image S. The partial image S is displaced in the x or y direction by ±10 pixels.

Described concretely below is the number of arithmetic operations in the image matching method according to the seventh embodiment of the present invention.

For example, assume that the image T is an image of the size of 128 pixels×128 pixels, the partial image S is an image of the size of 32 pixels×32 pixels, the image I is an image of the size of 128 pixels×128 pixels, and the ridgeline direction distribution views T and I are images of the size of 16 blocks× 16 blocks, and the partial image S and the ridgeline direction distribution view T are displaced pixel by pixel and block by block to obtain the relative position between the image T and the image I. Assume that 1 block=8 pixels×8 pixels.

In this case, the number N4 of arithmetic operations is a sum (1,260,000) of the number N4(1) of arithmetic operations=$16\times2\times16\times2\times16\times16\approx260,000$ for use in obtaining the relative position between the image T and the image I by the ridgeline direction distribution views T and I, the number N4(2) of arithmetic operations=$32\times32\times20\times20\approx410,000$ for use in obtaining the relative position between the image T and the image I by the partial image S, and the number N4(3) of arithmetic operations=$128\times128\times6\times6\approx590,000$ for use in obtaining the relative position between the image T and the image I by the entire image. The partial image S is displaced in the x or y direction by ±10 pixels, and the entire image is displaced in the x or y direction by ±3 pixels.

As described above, the number of arithmetic operations in the conventional image matching method is about 1,000,007,000 while the number of arithmetic operations in the image matching method according to the present invention is about 67,000,000, about 670,000, and about 1,260,000. Therefore, the number according to the present invention is much smaller than the number according to the conventional image matching method.

Figure 31:
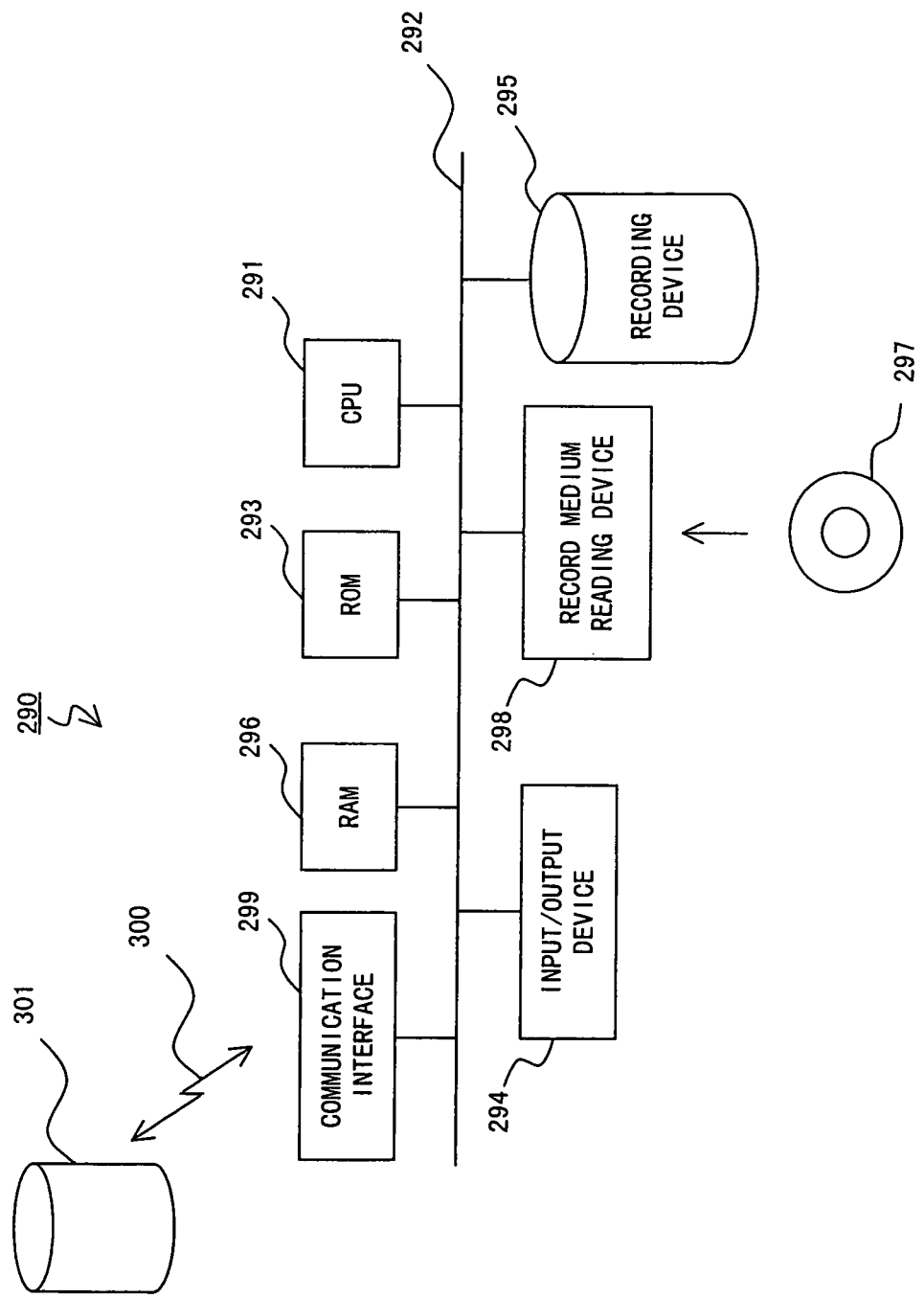
FIG. 31 shows an example of the hardware configuration required when an embodiment of the present invention is realized by a program.

FIG. 31 shows an example of the hardware configuration required when an embodiment of the present invention is realized by a program.

The process of the above-mentioned embodiment can be realized by a program operating in a computer 290. In this case, the computer 290 is realized by mutual data exchange by each device connected to a CPU 291 via a bus 292. BIOS, etc. is incorporated into ROM 293, and allows an input/output device 294 to exchange data when power is supplied. When the computer 290 is used as a image matching apparatus, the CPU 291 can perform execution by storing a program in the ROM 293. The input/output device 294 normally comprises a keyboard, a mouse, a display, etc., and can include the sensor 20 (scanner, etc.).

The program is stored in a storage device 295 such as a hard disk, etc., and is stored in RAM 296, and is executed by the CPU 291 at an instruction of the CPU 291 as necessary. Otherwise, the program stored in a portable record medium 297 such as a flexible disk, CD-ROM, a DVD, etc. as a portable medium to be read by a record medium reading device 298 as necessary, is retrieved into the RAM 296, and can be executed by the CPU 291. It is also possible to retrieve the program from the portable record medium 297 to the storage device 295, and then read the program from the RAM 296 to be executed by the CPU 291.

In the environment in which a computer network such as the Internet, etc. is widely used, a connection is made to a network 300 through a communication interface 299, and the program can be downloaded from an information provider 301 for execution. Otherwise, as frequently used in a LAN, when the information provider 301 functions as a server, in the network environment, a program can also be executed by the CPU 291 without direct download from the information provider 301. Furthermore, data about fingerprints can be transmitted to the information provider 301 for processing, and only a result can be received by the computer 290.

Furthermore, the input/output device 294 (especially, a device for reading fingerprint images) can be allocated at plural places where fingerprint image matching is required, and a central computer 290 can centrally perform the matching process.

In each embodiment from the first to eleventh embodiments, predetermined embodiments can be combined as necessary to form another embodiment.

As described above, according to the present invention, a partial image of a predetermined size is segmented from one image when two images are matched, and the relative position between the two images is adjusted using the partial image, and then it is described whether or not the two images match. Therefore, the number of arithmetic operations can be reduced for image matching than the conventional image matching in which the relative position of the entire images is adjusted for image matching. Thus, the time required to obtain a result as to whether or not two images match can be shorter than by the conventional image matching method.

Additionally, when the partial image refers to a characteristic portion of an image, a weight is applied in determination. As a result, a determination result can be obtained with high accuracy.

What is claimed is:

1. A non-transitory computer-readable medium storing an image matching program, which when executed by a computer, directs the computer to perform an image matching method, the image matching method comprising:

an extraction process extracting a first feature information including a position of the first image of a portion including a first characteristic structure and extracting a second feature information including a position of the second image of a portion including a second characteristic structure from first and second images, respectively;

a first adjustment process adjusting a relative position between the first and second images according to the extracted first and second feature information;

a partial image segmentation process dividing the first image into a number of blocks, obtaining a position when the largest correlation value between some of the blocks and at least one ridgeline direction distribution registered in advance is obtained, and segmenting a partial image, which includes the position, of a specified size from the first image;

a first searching process moving the partial image on the second image using the relative position adjusted by the first adjustment process, and searching for a position of the partial image where the partial image and the second image including a portion overlapping the partial image indicating a largest overlap;

a second adjustment process adjusting a relative position between the second image and the first image using the position searched for by the first searching process;

a second searching process moving the whole first image on the whole second image using a relative position adjusted by the second adjustment process, and searching for a position of the first image where the first image and the second image including a portion overlapping the first image indicating a largest overlap;

a third adjustment process adjusting a relative position between the second image and the first image using the position searched for by the second searching process; and a determination process determining by correlating the whole first image and the whole second image using an adjustment result of the third adjustment process as to whether or not the first image matches the second image.

2. The computer-readable medium according to claim 1, wherein:

the first adjustment process adjusts the relative position and a relative angle between the first and second images according to the first and second feature information;

the first searching process moves and rotates the partial image on the second image using the relative position and the relative angle adjusted by the first adjustment process, and searches for the position and a rotation angle of the partial image where the partial image and the second image including the portion overlapping the partial image indicating the largest overlap; the second adjustment process adjusts the relative position and the relative angle between the second image and the first image using the position and the rotation angle searched for by the first searching process;

the second searching process moves and rotates the first image on the second image using the relative position and a relative angle adjusted by the second adjustment process, and searches for the position and a rotation angle of the first image where the first image and the second image including the portion overlapping the first image indicating the largest overlap; and the third adjustment process adjusts the relative position and the relative angle between the second image and the first image using the position and the rotation angle searched for by the second searching process.

3. The computer-readable medium according to claim 1, wherein the partial image segmentation process calculates two or more correlation values between a partial image arbitrarily segmented from the first image and a portion overlapping the first image, and the first searching process uses a partial image indicating the largest correlation value among the two or more correlation values.

4. The computer-readable medium according to claim 1, wherein the partial image segmentation process segments two or more partial images of a specified size from the first image.

5. The computer-readable medium according to claim 4, wherein the partial image segmentation process calculates each correlation value between two or more partial images arbitrarily segmented from the first image and the image of the portion overlapping the first image, and the first searching process uses the partial image when the correlation value is large.

6. The computer-readable medium according to claim 1, wherein the first and second images are fingerprint images, the extraction process converts the first and second images to a ridgeline direction distribution view or a valley line direction distribution view, and the first and second feature information are extracted from the ridgeline direction distribution view or the valley line direction distribution view.

7. An image matching method comprising:
- an extraction process extracting a first feature information including a position of the first image of a portion including a first characteristic structure and extracting a second feature information including a position of the second image of a portion including a second characteristic structure from first and second images, respectively;
- a first adjustment process adjusting a relative position between the first and second images according to the extracted first and second feature information;
- a partial image segmentation process dividing the first image into a number of blocks, obtaining a position when the largest correlation value between some of the blocks and at least one ridgeline direction distribution registered in advance is obtained, and segmenting a partial image, which includes the position, of a specified size from the first image;
- a first searching process moving the partial image on the second image using the relative position adjusted by the first adjustment process, and searching for a position of the partial image where the partial image and the second image including a portion overlapping the partial image indicating a largest overlap;
- a second adjustment process adjusting a relative position between the second image and the first image using the position searched for by the first searching process;
- a second searching process moving the whole first image on the whole second image using a relative position adjusted by the second adjustment process, and searching for a position of the first image where the first image and the second image including a portion overlapping the first image indicating a largest overlap;
- a third adjustment process adjusting a relative position between the second image and the first image using the position searched for by the second searching process; and
- a determination process determining by correlating the whole first image and the whole second image using an adjustment result of the third adjustment process as to whether or not the first image matches the second image.

8. The image matching method according to claim 7, wherein the first and second images represent at least one of a fingerprint, an iris, a face, a palm and a vein.

9. An image matching apparatus which performs matching as to whether or not a first image and a second image match, the apparatus comprising:
- a computer-readable medium to store a image matching program; and
- a computer to execute the stored image matching program, execution of the image matching program configuring the computer to include:
  - an extraction unit to extract a first feature information including a position of the first image of a portion including a first characteristic structure and to extract a second feature information including a position of the second image of a portion including a second characteristic structure from first and second images, respectively;
  - a first adjustment unit to adjust a relative position between the first and second images according to the extracted first and second feature information;
  - a partial image segmentation unit to divide the first image into a number of blocks, to obtain a position when the largest correlation value between some of the blocks and at least one ridgeline direction distribution registered in advance is obtained, and to segment a partial image, which includes the position, of a specified size from the first image;
  - a first searching to move the partial image on the second image using the relative position adjusted by the first adjustment unit, and to search for a position of the partial image where the partial image and the second image including a portion overlapping the partial image indicating a largest overlap;
  - a second adjustment unit to adjust a relative position between the second image and the first image using the position searched for by the first searching unit;
  - a second searching unit to move the whole first image on the whole second image using a relative position adjusted by the second adjustment unit, and to search for a position of the first image where the first image and the second image including a portion overlapping the first image indicating a largest overlap;
  - a third adjustment unit to adjust a relative position between the second image and the first image using the position searched for by the second searching unit; and
  - a determination unit to determine by correlating the whole first image and the whole second image using an adjustment result of the third adjustment unit as to whether or not the first image matches the second image.

10. The image matching apparatus of claim 9, wherein the determination unit obtains a correlation value using a sum of angle differences of the ridgelines of overlapping blocks.

11. The image matching apparatus of claim 9, wherein the determination unit obtains a correlation value using a sum of differences of the values indicating the directions of the ridgelines of overlapping blocks.

12. The computer-readable medium of claim 1, wherein the method obtains a correlation value using a sum of angle differences of the ridgelines of overlapping blocks.

13. The computer-readable medium of claim 1, wherein the method obtains a correlation value using a sum of differences of the values indicating the directions of the ridgelines of overlapping blocks.

14. The image matching method of claim 7, wherein the partial image segmentation process further comprises obtaining an average angle from a plurality of tilt angles of a ridgeline in each of the blocks.

* * * * *